(12) United States Patent
Yamashita et al.

(10) Patent No.: US 9,638,447 B2
(45) Date of Patent: May 2, 2017

(54) AIR-CONDITIONING APPARATUS

(75) Inventors: Koji Yamashita, Tokyo (JP); Shinichi Wakamoto, Tokyo (JP); Naofumi Takenaka, Tokyo (JP); Kosuke Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 655 days.

(21) Appl. No.: 14/119,951

(22) PCT Filed: Jun. 29, 2011

(86) PCT No.: PCT/JP2011/003702
§ 371 (c)(1),
(2), (4) Date: Nov. 25, 2013

(87) PCT Pub. No.: WO2013/001572
PCT Pub. Date: Jan. 3, 2013

(65) Prior Publication Data
US 2014/0083123 A1    Mar. 27, 2014

(51) Int. Cl.
*F25B 7/00*    (2006.01)
*F25B 45/00*   (2006.01)
(Continued)

(52) U.S. Cl.
CPC .............. *F25B 49/02* (2013.01); *F25B 13/00* (2013.01); *F25B 2313/003* (2013.01); *F25B 2313/006* (2013.01); *F25B 2313/0231* (2013.01); *F25B 2313/0232* (2013.01); *F25B 2313/0233* (2013.01); *F25B 2313/0272* (2013.01); *F25B 2313/0294* (2013.01); *F25B 2313/02732* (2013.01); *F25B 2313/02741* (2013.01); *F25B 2313/0314* (2013.01); *F25B 2500/19* (2013.01);
(Continued)

(58) Field of Classification Search
CPC ................ F25B 13/00; F25B 2313/006; F25B 2313/0232; F25B 2500/19; F25B 2700/1933; Y02B 30/741
USPC ........................................ 62/175, 292, 324.6
See application file for complete search history.

(56) References Cited

U.S. PATENT DOCUMENTS 5,657,637 A * 8/1997 Mertens .................... B41F 7/24
                                                           62/175
6,233,961 B1 * 5/2001 Ashida .................... F25B 45/00
                                                           62/292
(Continued)

FOREIGN PATENT DOCUMENTS

JP    10-288411 A    10/1998
JP    2000-105005 A   4/2000
(Continued)

OTHER PUBLICATIONS

Extended European Search Report dated Jan. 26, 2015 issued in corresponding EP patent application No. 11868550.2.
(Continued)

*Primary Examiner* — Henry Crenshaw
(74) *Attorney, Agent, or Firm* — Posz Law Group, PLC

(57) ABSTRACT

In an air-conditioning apparatus, a controller controls an amount of refrigerant injection into a compressor by controlling an opening area of an expansion device such that the electric power consumption of the compressor becomes smaller, or such that a heating capacity or a cooling capacity of an intermediate heat exchanger becomes larger.

12 Claims, 15 Drawing Sheets

(51) Int. Cl.
  *F25B 13/00* (2006.01)
  *F25B 49/02* (2006.01)
(52) U.S. Cl.
  CPC .......... *F25B 2600/0253* (2013.01); *F25B 2600/2509* (2013.01); *F25B 2700/1931* (2013.01); *F25B 2700/1933* (2013.01); *F25B 2700/21151* (2013.01); *F25B 2700/21152* (2013.01); *F25B 2700/21173* (2013.01); *F25B 2700/21174* (2013.01); *F25B 2700/21175* (2013.01); *Y02B 30/741* (2013.01)

(56) References Cited

U.S. PATENT DOCUMENTS

| | | | |
|---|---|---|---|
| 7,077,149 B2* | 7/2006 | Kalley | F16L 29/02 137/1 |
| 7,100,384 B2* | 9/2006 | Leuthner | B60H 1/00907 62/160 |
| 7,185,506 B2* | 3/2007 | Aflekt | F24F 3/1405 62/324.1 |
| 2004/0074254 A1* | 4/2004 | Hiwata | F25B 9/008 62/402 |
| 2004/0107720 A1* | 6/2004 | Matsumoto | F25B 1/10 62/324.6 |
| 2006/0090506 A1* | 5/2006 | Meister | F25B 5/04 62/513 |
| 2008/0034765 A1* | 2/2008 | Takegami | F25B 13/00 62/175 |
| 2008/0098760 A1* | 5/2008 | Seefeldt | F25B 1/10 62/238.7 |
| 2008/0236184 A1* | 10/2008 | Morozumi | F04C 18/3442 62/324.6 |
| 2008/0314064 A1* | 12/2008 | Al-Eidan | F25B 13/00 62/324.6 |
| 2011/0048055 A1* | 3/2011 | Fujimoto | F25B 1/10 62/324.6 |

FOREIGN PATENT DOCUMENTS

| | | |
|---|---|---|
| JP | 2005-282972 A | 10/2005 |
| JP | 2007-051841 A | 3/2007 |
| JP | 2007-205596 A | 8/2007 |
| JP | 2009-127902 A | 6/2009 |
| WO | 99/26028 A1 | 5/1999 |
| WO | 2010/049998 A1 | 5/2010 |

OTHER PUBLICATIONS

Office Action mailed Jul. 1, 2014 issued in corresponding JP patent application No. 2013-522356 (and English translation).
International Search Report of the International Searching Authority mailed Aug. 30, 2011 for the corresponding international application No. PCT/JP2011/003702 (and English translation).
Communication pursuant to Article 94(3) EPC dated Dec. 21, 2016 issued in corresponding EP patent application No. 11 868 550.2.

* cited by examiner

F I G. 8
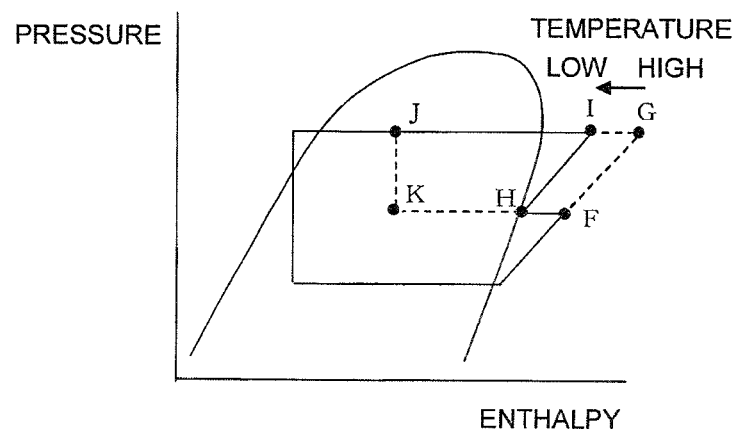

F I G. 1 0
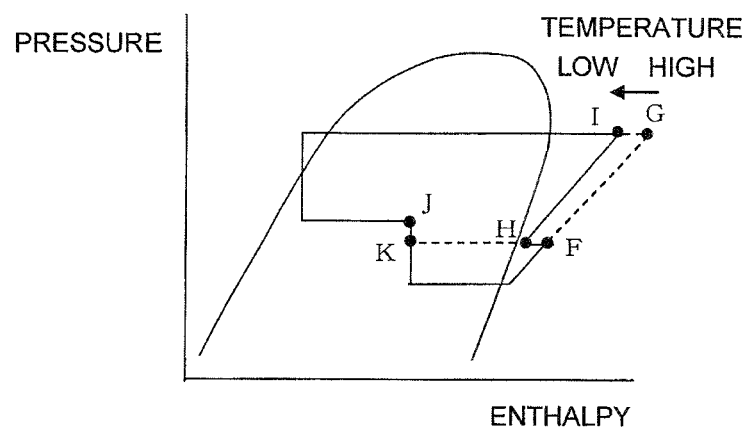

AIR-CONDITIONING APPARATUS

CROSS REFERENCE TO RELATED APPLICATIONS

This application is a U.S. national stage application of International Application No. PCT/JP2011/003702 filed on Jun. 29, 2011.

TECHNICAL FIELD

The present invention relates to an air-conditioning apparatus that is applied to, for example, a multi-air-conditioning apparatus for a building.

BACKGROUND ART

In air-conditioning apparatuses such as a multi-air-conditioning apparatus for a building, there is an air-conditioning apparatus that circulating a refrigerant from an outdoor unit to a relay unit and by circulating the heat medium such as water from the relay unit to the indoor units, thereby achieving a cooling and heating mixed operation while reducing the conveyance power of the heat medium (see Patent Literature 1, for example).

There is an air-conditioning apparatus that is equipped with a circuit that carries out liquid injection into a compressor through a high-pressure liquid pipe of a refrigeration cycle in order to reduce the discharge temperature of the compressor, in which the air-conditioning apparatus is capable of controlling the discharge temperature so as to accomplish a preset temperature regardless of the operation state (see Patent Literature 2, for example).

There is also an air-conditioning apparatus that carries out injection into a compressor (high-pressure shell compressor), whose hermetic vessel has a discharge pressure atmosphere therein, from an outlet side of a gas-liquid separator that is disposed in a high-pressure liquid pipe of a refrigeration cycle (see Patent Literature 3, for example).

CITATION LIST

Patent Literature

Patent Literature 1: WO10/049,998 (p. 3, FIG. 1, for example)
Patent Literature 2: Japanese Unexamined Patent Application Publication No. 2005-282972 (p. 4, FIG. 1, for example)
Patent Literature 3: Japanese Unexamined Patent Application Publication No. 2009-127902 (p. 4, FIG. 1, for example)

SUMMARY OF INVENTION

Technical Problem

The air-conditioning apparatus such as the multi-air-conditioning apparatus for a building described in Patent Literature 1 encounters no problem when a refrigerant such as R410A is employed as its refrigerant; however, when an R32 refrigerant or the like is employed, the discharge temperature of the compressor becomes excessively high during a heating operation or the like when the outside air temperature is low. As such, there is a possibility of degradation of the refrigerant and the refrigerating machine oil. Furthermore, although Patent Literature 1 gives a description of a simultaneous cooling and heating operation, no description is given of a method of reducing the discharge temperature or a method of improving the heating capacity during heating under low outside air. Note that in a multi-air-conditioning apparatus for a building, an expansion device such as an electronic expansion valve that decompresses a refrigerant is typically disposed in a relay unit or in an indoor unit that is far apart from an outdoor unit.

Regarding the air-conditioning apparatus of Patent Literature 2, the literature merely describes a method of carrying out injection from the high-pressure liquid pipe. As such, there is a problem in that the air-conditioning apparatus is not applicable to cases such as when the circulation route of the refrigeration cycle is reversed (switching between cooling and heating). In addition, the air-conditioning apparatus described in Patent Literature 2 also does not deal with a cooling and heating mixed operation. Furthermore, the second cited document does not give any description of the method of controlling an injection flow rate in order to maximize efficiency (COP).

The air-conditioning apparatus described in Patent Literature 3 discloses a method of carrying out injection from the high-pressure liquid pipe during a cooling operation and a heating operation while employing a plurality of check valves; however, an expansion device, such as an electronic expansion valve or the like, is not disposed in the indoor unit posing a problem in that the invention is only applicable when the expansion device is disposed in the outdoor unit. Note that the air-conditioning apparatus described in Patent Literature 3 employs a compressor having a low-pressure shell structure. In addition, the air-conditioning apparatus described in Patent Literature 3 is not applicable to a cooling and heating mixed operation. Furthermore, the third cited document does not give any description of the method of controlling an injection flow rate in order to maximize efficiency (COP).

The present invention has been made in order to overcome the above problems and an object thereof is to provide an air-conditioning apparatus that appropriately controls the flow rate of the injection refrigerant such that the system performance (COP) becomes high as much as possible while reducing the discharge temperature of the compressor, or an air-conditioning apparatus that appropriately controls the flow rate of the injection refrigerant such that the system performance (COP) becomes high as much as possible while improving the heating capacity during heating under low outside air.

Solution to Problem

An air-conditioning apparatus according to the present invention includes a refrigeration cycle constituted by connecting, with a pipe, a compressor having a low-pressure shell structure, a refrigerant flow switching device, a first heat exchanger, a first expansion device and at least one second heat exchanger. The air-conditioning apparatus further includes an injection pipe configured to introduce a refrigerant from outside the compressor into a compression chamber through an opening port, the opening port being provided in a portion of the compression chamber of the compressor that is in the midst of a compression process; a second expansion device provided in the injection pipe; and a controller configured to control an amount of refrigerant injection into the compressor by controlling an opening degree of the second expansion device such that electric power consumption of the compressor reduces, such that a heating capacity or a cooling capacity of a load-side heat exchanger that is either the first heat exchanger or the at least one second heat exchanger increases, or such that COP obtained by dividing the heating capacity or the cooling capacity by the electric power consumption becomes larger.

Advantageous Effects of Invention

The air-conditioning apparatus according to the present invention optimally controls the injection flow rate to the compressor. Accordingly, the system COP is improved and contribution to energy saving can be achieved.

BRIEF DESCRIPTION OF DRAWINGS

FIG. 8 is a P-h diagram (pressure-enthalpy diagram) illustrating a state transition of a heat source side refrigerant during the cooling main operation mode of the air-conditioning apparatus according to Embodiment 1 of the present invention.

FIG. 10 is a P-h diagram (pressure-enthalpy diagram) illustrating a state transition of a heat source side refrigerant during the heating main operation mode of the air-conditioning apparatus according to Embodiment 1 of the present invention.

DESCRIPTION OF EMBODIMENTS

Embodiments of the present invention will be described below with reference to the drawings.

Embodiment 1

Figure 1:
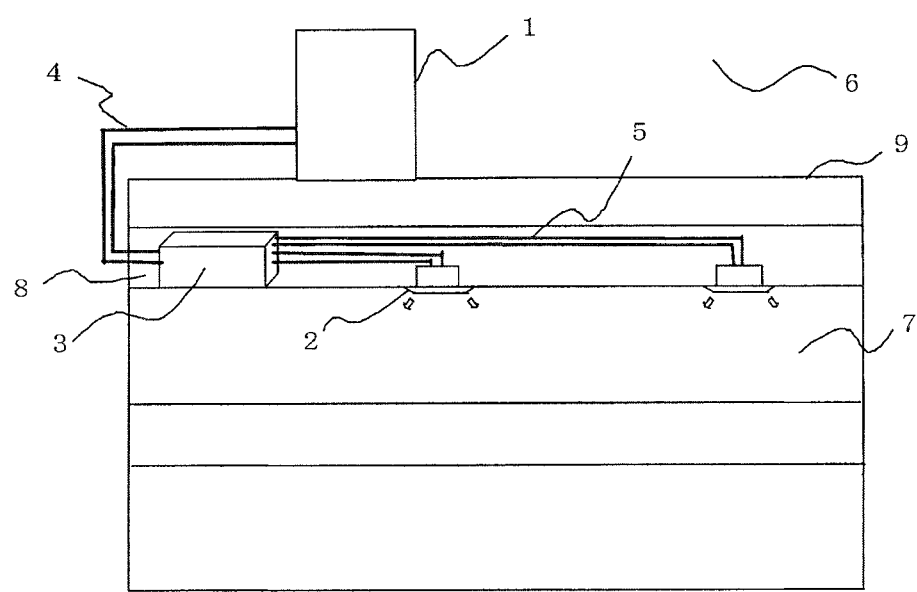
FIG. 1 is a schematic diagram illustrating an exemplary installation of an air-conditioning apparatus according to Embodiment 1 of the present invention.

FIG. 1 is a schematic diagram illustrating an exemplary installation of an air-conditioning apparatus according to Embodiment 1 of the present invention. The exemplary installation of the air-conditioning apparatus will be described with reference to FIG. 1. This air-conditioning apparatus allows each indoor unit to freely select a cooling mode or a heating mode as its operation mode by using refrigeration cycles (a refrigerant circuit A and a heat medium circuit B) that circulate refrigerants (a heat source side refrigerant and a heat medium). Note that the dimensional relationships of the components in the subsequent drawings including FIG. 1 may be different from the actual ones.

Referring to FIG. 1, the air-conditioning apparatus according to Embodiment 1 includes a single outdoor unit 1 that functions as a heat source unit, a plurality of indoor units 2, and a heat medium relay unit 3 disposed between the outdoor unit 1 and the indoor units 2. The heat medium relay unit 3 exchanges heat between the heat source side refrigerant and the heat medium. The outdoor unit 1 and the heat medium relay unit 3 are connected with refrigerant pipes 4 through which the heat source side refrigerant flows. The heat medium relay unit 3 and each indoor unit 2 are connected with pipes (heat medium pipes) 5 through which the heat medium flows. Cooling energy or heating energy generated in the outdoor unit 1 is delivered to the indoor units 2 through the heat medium relay unit 3.

The outdoor unit 1 is typically disposed in an outdoor space 6 that is a space (for example, a roof) outside a structure 9, such as a building, and supplies cooling energy or heating energy to the indoor units 2 through the heat medium relay unit 3. Each indoor unit 2 is disposed at a position by which it can supply air for cooling or air for heating to an indoor space 7, which is a space (for example, a living room) inside the structure 9, and supplies the air for cooling or air for heating to the indoor space 7 that is an air-conditioning target space. The heat medium relay unit 3 is configured as a casing separate from the outdoor unit 1 and the indoor units 2 such that the heat medium relay unit 3 can be disposed at a position different from those of the outdoor space 6 and the indoor space 7. The heat medium relay unit 3 is connected to the outdoor unit 1 and the indoor units 2 through the refrigerant pipes 4 and the pipes 5, respectively, to convey cooling energy or heating energy supplied from the outdoor unit 1 to the indoor units 2.

As illustrated in FIG. 1, in the air-conditioning apparatus according to Embodiment 1, the outdoor unit 1 is connected to the heat medium relay unit 3 with two refrigerant pipes 4, and the heat medium relay unit 3 is connected to each indoor unit 2 with two pipes 5. As above, the air-conditioning apparatus according to Embodiment 1 employs two pipes (the refrigerant pipes 4 or pipes 5) to connect each of the units (the outdoor unit 1, the indoor units 2, and the heat medium relay unit 3); accordingly, construction work is facilitated.

Note that FIG. 1 illustrates a state in which the heat medium relay unit 3 is disposed inside the structure 9 but in a space different from the indoor space 7, such as a space above a ceiling (hereinafter, simply referred to as a space 8). The heat medium relay unit 3 can be disposed in other spaces, such as a common space where there is an elevator or the like. Furthermore, in FIG. 1, although an exemplary case in which the indoor units 2 are of a ceiling-mounted cassette type is illustrated, the indoor units 2 are not limited to this type and any type that can blow out air for heating or air for cooling to the indoor space 7 directly, through a duct, or the like can be employed, such as a ceiling-concealed type or a ceiling-suspended type.

While FIG. 1 illustrates an exemplary case in which the outdoor unit 1 is disposed in the outdoor space 6, the arrangement is not limited to this case. For example, the outdoor unit 1 may be disposed in an enclosed space, for example, a machine room with a ventilation opening, may be disposed inside the structure 9 as long as waste heat can be exhausted through an exhaust duct to the outside of the structure 9, or may be disposed inside the structure 9 while employing an outdoor unit 1 of a water-cooled type. The outdoor unit 1 may be disposed in any kind of place without causing any problem in particular.

Furthermore, the heat medium relay unit 3 can be disposed near the outdoor unit 1. However, it should be understood that when the distance from the heat medium relay unit 3 to each indoor unit 2 is excessively long, the energy saving effect is reduced due to a significant increase in the conveyance power of the heat medium. Additionally, the numbers of connected outdoor units 1, indoor units 2, and heat medium relay units 3 are not limited to those illustrated in FIG. 1. The numbers thereof may be determined in accordance with the structure 9 where the air-conditioning apparatus according to Embodiment 1 is installed.

In a case in which a plurality of heat medium relay units 3 are connected to a single outdoor unit 1, the plurality of heat medium relay units 3 can be disposed in a interspersed manner in a common space, a space above a ceiling, and the like of a structure such as a building. With this configuration, an air conditioning load can be covered with an intermediate heat exchanger inside each heat medium relay unit 3. Furthermore, each indoor unit 2 can be disposed at a distance or at a height that is within the conveyable range of a heat medium sending device inside the respective heat medium relay unit 3. Accordingly, the indoor units 2 can be disposed throughout an entire structure such as a building.

Figure 2:
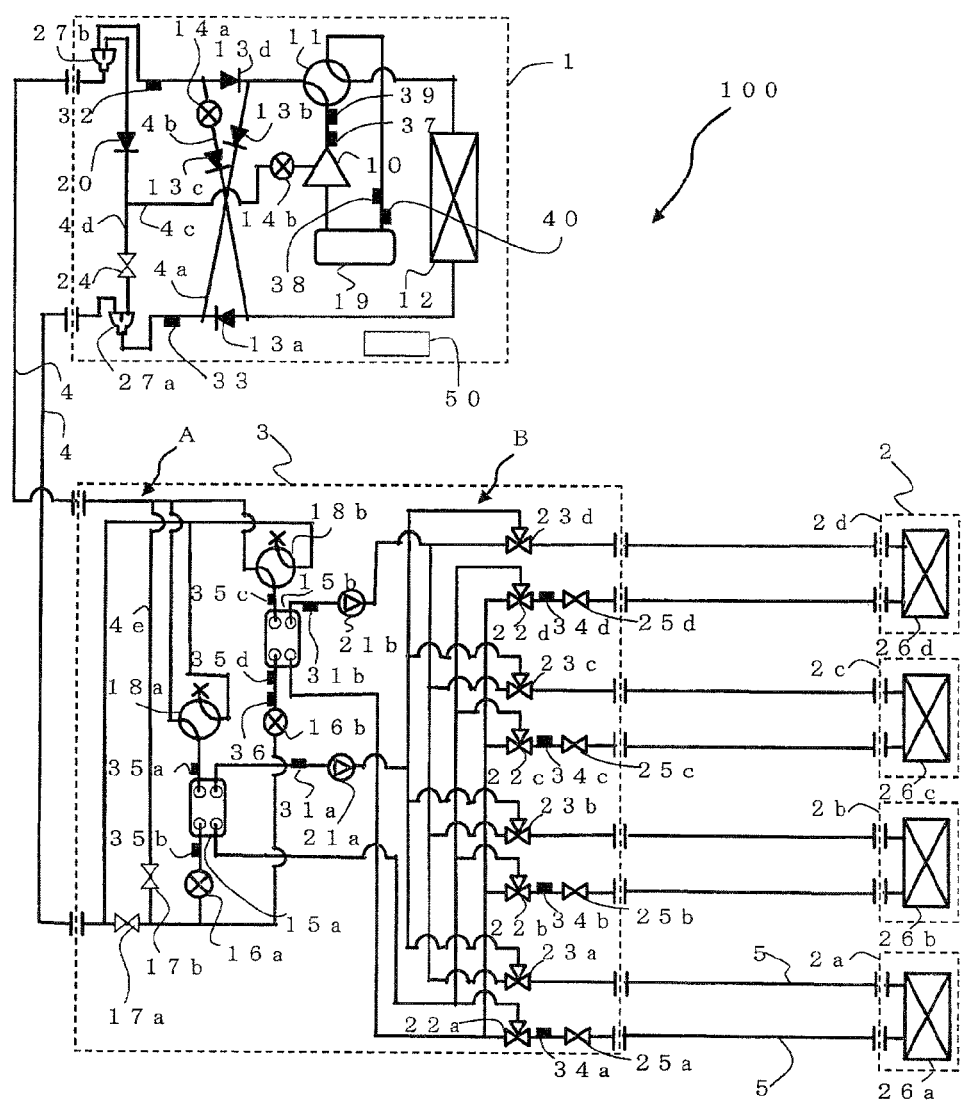
FIG. 2 is a schematic circuit diagram illustrating an exemplary circuit configuration of the air-conditioning apparatus according to Embodiment 1 of the present invention.

FIG. 2 is a schematic circuit diagram illustrating an exemplary circuit configuration of the air-conditioning apparatus (hereinafter, referred to as an air-conditioning apparatus 100) according to Embodiment 1. The detailed configuration of the air-conditioning apparatus 100 will be described with reference to FIG. 2. As illustrated in FIG. 2, the outdoor unit 1 and the heat medium relay unit 3 are connected with the refrigerant pipes 4 through intermediate heat exchangers 15*a* and 15*b* included in the heat medium relay unit 3. Furthermore, the heat medium relay unit 3 and the indoor units 2 are connected with the pipes 5 through the intermediate heat exchangers 15*a* and 15*b*. Note that the refrigerant pipe 4 and the pipe 5 will be described in detail later.

[Outdoor Unit 1]

In the outdoor unit 1 is installed a compressor 10, a first refrigerant flow switching device 11, such as a four-way valve, a heat source side heat exchanger 12, and an accumulator 19, which are connected in series with the refrigerant pipes 4. The outdoor unit 1 is further provided with a first connecting pipe 4*a*, a second connecting pipe 4*b*, a check valve 13*a*, a check valve 13*b*, a check valve 13*c*, and a check valve 13*d*. By providing the first connecting pipe 4*a*, the second connecting pipe 4*b*, the check valve 13*a*, the check valve 13*b*, the check valve 13*c*, and the check valve 13*d*, the heat source side refrigerant can be made to flow into the heat medium relay unit 3 in a constant direction irrespective of the operation requested by the indoor units 2.

The compressor 10 draws in the heat source side refrigerant and compresses the heat source side refrigerant into a high-temperature high-pressure state. The compressor 10 may include, for example, a capacity-controllable inverter compressor. The first refrigerant flow switching device 11 switches the flow of the heat source side refrigerant between a heating operation (a heating only operation mode and a heating main operation mode) and a cooling operation (a cooling only operation mode and a cooling main operation mode). The heat source side heat exchanger 12 functions as an evaporator during the heating operation, functions as a condenser (or a radiator) during the cooling operation, exchanges heat between air supplied from an air-sending device (not illustrated) and the heat source side refrigerant, and evaporates and gasifies or condenses and liquefies the heat source side refrigerant. The accumulator 19 is provided on the suction side of the compressor 10 and retains excessive refrigerant due to the difference between the heating operation and the cooling operation or excessive refrigerant due to a transitional operation change.

The check valve 13*d* is provided in the refrigerant pipe 4 between the heat medium relay unit 3 and the first refrigerant flow switching device 11 and permits the heat source side refrigerant to flow only in a predetermined direction (the direction from the heat medium relay unit 3 to the outdoor unit 1). The check valve 13*a* is provided in the refrigerant pipe 4 between the heat source side heat exchanger 12 and the heat medium relay unit 3 and permits the heat source side refrigerant to flow only in a predetermined direction (the direction from the outdoor unit 1 to the heat medium relay unit 3). The check valve 13*b* is provided in the first connecting pipe 4*a* and allows the heat source side refrigerant discharged from the compressor 10 to flow to the heat medium relay unit 3 during the heating operation. The check valve 13*c* is provided in the second connecting pipe 4*b* and allows the heat source side refrigerant that has returned from the heat medium relay unit 3 to flow to the suction side of the compressor 10 during the heating operation.

The first connecting pipe 4*a* in the outdoor unit 1 connects the refrigerant pipe 4, between the first refrigerant flow switching device 11 and the check valve 13*d*, to the refrigerant pipe 4, between the check valve 13*a* and the heat medium relay unit 3. The second connecting pipe 4*b* in the outdoor unit 1 connects the refrigerant pipe 4, between the check valve 13*d* and the heat medium relay unit 3, to the refrigerant pipe 4, between the heat source side heat exchanger 12 and the check valve 13*a*.

The outdoor unit 1 is further provided with a branching device 27*a*, a branching device 27*b*, an opening and closing device 24, a backflow prevention device 20, an expansion device 14a, an expansion device 14b, an intermediate pressure detection device 32, a branched-refrigerant temperature detection device 33, a discharge-refrigerant temperature detection device 37, a suction-refrigerant temperature detection device 38, a suction-refrigerant pressure detection device 40, a high-pressure detection device 39, an injection pipe 4c, a branch pipe 4d, and a controller 50. Furthermore, the compressor 10 has a compression chamber inside its hermetic vessel. The compressor 10 has a low-pressure shell structure in which the hermetic vessel has a low-pressure refrigerant pressure atmosphere therein and in which the low-pressure refrigerant inside the hermetic vessel is sucked into the compression chamber to be compressed.

An opening port is provided to a portion of the compression chamber of the compressor 10, and the injection pipe 4c that introduces the refrigerant from the outside of the hermetic vessel into the compression chamber through the opening port is provided. As such, injection of a high-pressure or medium-pressure refrigerant into the compression chamber of the compressor 10 can be carried out. By carrying out injection of a high-pressure or medium-pressure refrigerant into the compression chamber of the compressor 10, the discharge temperature of the compressor 10 can be reduced and, further, the heating capacity can be improved during a heating operation under low outside air in a case in which a refrigerant, such as R32, whose discharge temperature from the compressor 10 becomes high, is used.

The controller 50 is devised so that it can control the flow rate of the refrigerant to be injected into the compression chamber of the compressor 10 by controlling the opening and closing device 24, the expansion device 14a, the expansion device 14b, and the like. Appropriate control of the refrigerant injection amount allows control to be carried out so that the operation efficiency (COP) is increased as much as possible while carrying out the required actions, such as reducing the discharge temperature and increasing the heating capacity. Note that specific control operations for controlling the refrigerant injection amount will be described later when the operation of each operation mode is described.

The branch pipe 4d connects the branching device 27a, provided in the downstream of the check valve 13a and the check valve 13b, and the branching device 27b, provided in the upstream of the check valve 13d and the check valve 13c. The branch pipe 4d is provided with, in order from the branching device 27b side, the backflow prevention device 20 and the opening and closing device 24. The injection pipe 4c connects the branch pipe 4d, between the backflow prevention device 20 and the expansion device 14b, and the injection port (not shown) of the compressor 10. This injection port is in communication with the opening port formed in a portion of the compression chamber of the compressor 10. That is, the injection pipe 4c enables the refrigerant to be introduced from the outside of the hermetic vessel of the compressor 10 into the compression chamber. Furthermore, the injection pipe 4c is connected to the branch pipe 4d through a connecting port formed in the branch pipe 4d.

The branching device 27a branches the refrigerant that has passed through the check valve 13a or the check valve 13b into the refrigerant pipe 4 and the branch pipe 4d. The branching device 27b branches the refrigerant that has returned from the heat medium relay unit 3 into a refrigerant that flows into the branch pipe 4d and a refrigerant that flows into the check valve 13b or the check valve 13c. The backflow prevention device 20 permits the refrigerant to flow only in a predetermined direction (the direction from the branching device 27b to the branching unit 27a). The opening and closing device 24 includes a two-way valve and is configured to open or close the branch pipe 4d. The expansion device 14a is provided in the upstream of the check valve 13c in the second connecting pipe 4b and is configured to decompress and expand the refrigerant flowing through the second connecting pipe 4b. The expansion device 14b is provided in the injection pipe 4c and is configured to decompress and expand the refrigerant flowing through the injection pipe 4c.

The intermediate pressure detection device 32 is provided in the upstream of the check valve 13d and the expansion device 14a and downstream of the branching device 27b. The intermediate pressure detection device 32 detects the pressure of the refrigerant flowing in the refrigerant pipe 4 at its disposed position. The branched-refrigerant temperature detection device 33 is provided between the check valve 13a and the branching device 27a and detects the temperature of the refrigerant flowing in the refrigerant pipe 4 at its disposed position. The discharge-refrigerant temperature detection device 37 is provided on the discharge side of the compressor 10 and detects the temperature of the refrigerant that has been discharged from the compressor 10. The suction-refrigerant temperature detection device 38 is provided on the suction side of the compressor 10 and detects the temperature of the refrigerant that is to be sucked into the compressor 10. The suction-refrigerant pressure detection device 40 is provided on the suction side of the compressor 10 and detects the pressure of the refrigerant that is to be sucked into the compressor 10. The high-pressure detection device 39 is provided on the discharge side of the compressor 10 and detects the pressure of the refrigerant that has been discharged from the compressor 10.

Note that the controller 50 includes a microcomputer or the like and carries out control on the basis of information detected by various detection devices and a command from a remote control. The controller 50 controls the above-described actuators (driving components such as the opening and closing device 24, the expansion device 14a, the expansion device 14b), as well as the driving frequency of the compressor 10, the rotation speed (including ON/OFF) of the air-sending device (not shown), switching of the first refrigerant flow switching device 11, and the like to execute each operation mode described below.

[Indoor Units 2]

Each indoor unit 2 is mounted with a use side heat exchanger 26. Each use side heat exchanger 26 is connected to a heat medium flow control device 25 and a second heat medium flow switching device 23 in the heat medium relay unit 3 with pipes 5. The use side heat exchanger 26 exchanges heat between air supplied from an air-sending device, such as a fan, (not shown) and the heat medium and generates air for heating or air for cooling to be supplied to the indoor space 7.

FIG. 2 illustrates an exemplary case in which four indoor units 2 are connected to the heat medium relay unit 3. From the bottom of the drawing, an indoor unit 2a, an indoor unit 2b, an indoor unit 2c, and an indoor unit 2d are illustrated. Furthermore, the use side heat exchangers 26 are illustrated as, from the bottom of the drawing, a use side heat exchanger 26a, a use side heat exchanger 26b, a use side heat exchanger 26c, and a use side heat exchanger 26d so as to correspond to the indoor units 2a to 2d. Note that, as is the case of FIG. 1, the number of connected indoor units 2 is not limited to four as illustrated in FIG. 2.

[Heat Medium Relay Unit 3]

In the heat medium relay unit 3 is installed two intermediate heat exchangers 15, two expansion devices 16, two opening and closing devices 17, two second refrigerant flow switching devices 18, two pumps 21, four first heat medium flow switching devices 22, the four second heat medium flow switching devices 23, and the four heat medium flow control devices 25.

Each of the two intermediate heat exchangers 15 (the intermediate heat exchanger 15a and the intermediate heat exchanger 15b) functions as a condenser (radiator) or an evaporator and exchanges heat between the heat source side refrigerant and the heat medium to transfer cooling energy or heating energy, generated in the outdoor unit 1 and stored in the heat source side refrigerant, to the heat medium. The intermediate heat exchanger 15a is provided between an expansion device 16a and a second refrigerant flow switching device 18a in the refrigerant circuit A and is used to cool the heat medium in a cooling and heating mixed operation mode. Furthermore, the intermediate heat exchanger 15b is provided between an expansion device 16b and a second refrigerant flow switching device 18b in the refrigerant circuit A and is used to heat the heat medium in the cooling and heating mixed operation mode.

The two expansion devices 16 (the expansion device 16a and the expansion device 16b) each have a function of a pressure reducing valve and an expansion valve and are configured to decompress and expand the heat source side refrigerant. The expansion device 16a is provided in the upstream of the intermediate heat exchanger 15a, that is, upstream with respect to the heat source side refrigerant flow during the cooling operation. The expansion device 16b is disposed in the upstream of the intermediate heat exchanger 15b, that is, upstream with respect to the heat source side refrigerant flow during the cooling operation. Each of the two expansion devices 16 may include a component that can variably control its opening degree (opening area), such as an electronic expansion valve.

The two opening and closing devices 17 (an opening and closing device 17a and an opening and closing device 17b) each include, for example, a two-way valve, and open and close the refrigerant pipe 4. The opening and closing device 17a is provided in the refrigerant pipe 4 on the inlet side of the heat source side refrigerant. The opening and closing device 17b is provided in a pipe (a bypass pipe 4e) connecting the refrigerant pipe 4 on the inlet side of the heat source side refrigerant and the refrigerant pipe 4 on the outlet side thereof. Note that the opening and closing devices 17 may be any device that can open and close the refrigerant pipe 4, and a device that can variably control its opening degree, such as an electronic expansion valve, may be employed.

The two second refrigerant flow switching devices 18 (the second refrigerant flow switching device 18a and the second refrigerant flow switching device 18b) each include, for example, a four-way valve, and switch the flow of the heat source side refrigerant so as to allow the corresponding intermediate heat exchanger 15 to function as a condenser or an evaporator according to the operation mode. The second refrigerant flow switching device 18a is provided in the downstream of the intermediate heat exchanger 15a, that is, downstream with respect to the heat source side refrigerant flow during the cooling operation. The second refrigerant flow switching device 18b is provided in the downstream of the intermediate heat exchanger 15b, that is, downstream with respect to the heat source side refrigerant flow during the cooling only operation.

The two pumps 21 (a pump 21a and a pump 21b) are each configured to circulate the heat medium flowing through the pipes 5 in the heat medium circuit B. The pump 21a is provided in the pipe 5 between the intermediate heat exchanger 15a and the second heat medium flow switching devices 23. The pump 21b is provided in the pipe 5 between the intermediate heat exchanger 15b and the second heat medium flow switching devices 23. The two pumps 21 each include, for example, a capacity-controllable pump. It is preferable that the pumps are each capable of controlling the flow rate according to the load in the respective indoor units 2.

The four first heat medium flow switching devices 22 (a first heat medium flow switching device 22a to a first heat medium flow switching device 22d) each include, for example, a three-way valve and are configured to switch heat medium passages. The first heat medium flow switching devices 22 are provided so that the number thereof (four in this case) corresponds to the number of the installed indoor units 2. Each first heat medium flow switching device 22 is provided on an outlet side of a heat medium passage of the corresponding use side heat exchanger 26 such that one of the three ways is connected to the intermediate heat exchanger 15a, another one of the three ways is connected to the intermediate heat exchanger 15b, and the other one of the three ways is connected to the corresponding heat medium flow control device 25. Note that the first heat medium flow switching device 22a, the first heat medium flow switching device 22b, the first heat medium flow switching device 22c, and the first heat medium flow switching device 22d are illustrated in this order from the bottom of the drawing, so as to correspond to the indoor units 2. Furthermore, the switching of the heat medium passage not only refers to a complete switching from one way to the other but also includes partial switching from one way to the other.

The four second heat medium flow switching devices 23 (a second heat medium flow switching device 23a to a second heat medium flow switching device 23d) each include, for example, a three-way valve and are configured to switch heat medium passages. The second heat medium flow switching devices 23 are provided so that the number thereof (four in this case) corresponds to the number of the installed indoor units 2. Each second heat medium flow switching device 23 is provided in the heat medium passage on an inlet side of the corresponding use side heat exchanger 26 such that one of the three ways is connected to the intermediate heat exchanger 15a, another one of the three ways is connected to the intermediate heat exchanger 15b, and the other one of the three ways is connected to the corresponding use side heat exchanger 26. Note that the second heat medium flow switching device 23a, the second heat medium flow switching device 23b, the second heat medium flow switching device 23c, and the second heat medium flow switching device 23d are illustrated from the bottom of the drawing, so as to correspond to the indoor units 2. Furthermore, the switching of the heat medium passage not only refers to a complete switching from one way to the other but also includes partial switching from one way to the other.

The four heat medium flow control devices 25 (a heat medium flow control device 25a to a heat medium flow control device 25d) each include, for example, a two-way valve capable of controlling the area of opening and controls the flow rate of the flow in the corresponding pipe 5. The heat medium flow control devices 25 are provided so that the number thereof (four in this case) corresponds to the number of the installed indoor units 2. Each heat medium flow control device 25 is provided in the heat medium passage on the outlet side of the corresponding use side heat exchanger 26 such that one way is connected to the use side heat exchanger 26 and the other way is connected to the first heat medium flow switching device 22. That is, each heat medium flow control device 25 controls the amount of heat medium flowing into the corresponding indoor unit 2 on the basis of the temperature of the heat medium flowing in and the temperature of the heat medium flowing out of the indoor unit 2, and thus is capable of supplying the optimum amount of heat medium corresponding to the indoor load to the indoor unit 2.

Note that the heat medium flow control device 25a, the heat medium flow control device 25b, the heat medium flow control device 25c, and the heat medium flow control device 25d are illustrated in this order from the bottom of the drawing, so as to correspond to the indoor units 2. In addition, each of the heat medium flow control devices 25 may be provided in the heat medium passage on the inlet side of the corresponding use side heat exchanger 26. Additionally, each heat medium flow control device 25 may be disposed in the heat medium passage on the inlet side of the corresponding use side heat exchanger 26, that is, between the corresponding second heat medium flow switching device 23 and use side heat exchanger 26. Furthermore, when no load is required in the indoor unit 2 such as during suspension or thermo-off, the heat medium flow control device 25 may be fully closed to allow the supply of the heat medium to the indoor unit 2 to be stopped.

The heat medium relay unit 3 is provided with various detecting devices (two first temperature sensors 31, four second temperature sensors 34, four third temperature sensors 35, and two pressure sensor 36). Information (temperature information and pressure information) detected by these detection devices is transmitted to a controller (for example, the controller 50) that performs integrated control of the operation of the air-conditioning apparatus 100. The information is used to control the driving frequency of the compressor 10, the rotation speed of the air-sending device (not shown), switching of the first refrigerant flow switching device 11, the driving frequency of the pumps 21, switching of the second refrigerant flow switching devices 18, switching of the heat medium passage, and the like. Note that while an exemplary state in which the controller 50 is installed inside the outdoor unit 1 is illustrated, not limited to this arrangement, the controller 50 may be transmissibly mounted in the heat medium relay unit 3 or the indoor units 2, or in each of the units.

Each of the two first temperature sensors 31 (a first temperature sensor 31a and a first temperature sensor 31b) detects the temperature of the heat medium that has flowed out of the corresponding intermediate heat exchanger 15, that is, the heat medium at the outlet of the corresponding intermediate heat exchanger 15 and may include, for example, a thermistor. The first temperature sensor 31a is disposed in the pipe 5 on the inlet side of the pump 21a. The first temperature sensor 31b is disposed in the pipe 5 on the inlet side of the pump 21b.

Each of the four second temperature sensors 34 (a second temperature sensor 34a to a second temperature sensor 34d) is disposed between the corresponding first heat medium flow switching device 22 and heat medium flow control device 25 and detects the temperature of the heat medium that has flowed out of the corresponding use side heat exchanger 26. The second temperature sensors 34 may each include, for example, a thermistor. The second temperature sensors 34 are provided so that the number thereof (four in this case) corresponds to the number of the installed indoor units 2. Note that the second temperature sensor 34a, the second temperature sensor 34b, the second temperature sensor 34c, and the second temperature sensor 34d are illustrated in this order from the bottom of the drawing, so as to correspond to the indoor units 2.

Each of the four third temperature sensors 35 (a third temperature sensor 35a to a third temperature sensor 35d) is disposed on the inlet side or the outlet side of the heat source side refrigerant of the intermediate heat exchanger 15 and detects the temperature of the heat source side refrigerant flowing into the intermediate heat exchanger 15 or the temperature of the heat source side refrigerant flowing out of the intermediate heat exchanger 15. The third temperature sensors 35 may each include, for example, a thermistor. The third temperature sensor 35a is provided between the intermediate heat exchanger 15a and the second refrigerant flow switching device 18a. The third temperature sensor 35b is provided between the intermediate heat exchanger 15a and the expansion device 16a. The third temperature sensor 35c is provided between the intermediate heat exchanger 15b and the second refrigerant flow switching device 18b. The third temperature sensor 35d is provided between the intermediate heat exchanger 15b and the expansion device 16b.

Similarly to the installation position of the third temperature sensor 35d, the pressure sensor 36 is disposed between the intermediate heat exchanger 15b and the expansion device 16b and is configured to detect the pressure of the heat source side refrigerant flowing between the intermediate heat exchanger 15b and the expansion device 16b.

Note that the heat medium relay unit 3 is equipped with a controller (not shown) that includes, for example, a microcomputer. This controller controls, for example, driving of the pumps 21, the opening degree of each expansion device 16, opening and closing of each opening and closing device 17, switching of the second refrigerant flow switching devices 18, switching of the first heat medium flow switching devices 22, switching of the second heat medium flow direction switching devices 23, and the opening degree of each heat medium flow control device 25 on the basis of the information detected by the various detecting devices and a command from a remote control to carry out the operation modes which will be described later. Note that the controller may be provided only in either one of the outdoor unit 1 and the heat medium relay unit 3. That is, the controller 50 equipped in the outdoor unit 1 may control each devices mounted in the heat medium relay unit 3.

The pipes 5 in which the heat medium flows include the pipes connected to the intermediate heat exchanger 15a and the pipes connected to the intermediate heat exchanger 15b. The pipes 5 are branched (into four in this case) in accordance with the number of indoor units 2 connected to the heat medium relay unit 3. The pipes 5 are connected with the first heat medium flow switching devices 22 and the second heat medium flow switching devices 23. Controlling the first heat medium flow switching device 22 and the second heat medium flow switching device 23 determines whether the heat medium from the intermediate heat exchanger 15a is to flow into the use side heat exchanger 26 or whether the heat medium from the intermediate heat exchanger 15b is to flow into the use side heat exchanger 26.

In the air-conditioning apparatus 100, the refrigerant circuit A is constituted by the compressor 10, the first refrigerant flow switching device 11, the heat source side heat exchanger 12, the opening and closing devices 17, the second refrigerant flow switching devices 18, refrigerant passages of the intermediate heat exchanger 15a, the expansion devices 16, and the accumulator 19 that are connected with the refrigerant pipes 4. Furthermore, the heat medium circuit B is constituted by the heat medium passages of the intermediate heat exchangers 15a, the pumps 21, the first heat medium flow switching devices 22, the heat medium flow control devices 25, the use side heat exchangers 26, and the second heat medium flow switching devices 23 that are connected with the pipes 5. That is, the plurality of use side heat exchangers 26 are connected in parallel to each of the intermediate heat exchangers 15, thus turning the heat medium circuit B into a multi-system.

Accordingly, in the air-conditioning apparatus 100, the outdoor unit 1 and the heat medium relay unit 3 are connected through the intermediate heat exchanger 15a and the intermediate heat exchanger 15b provided in the heat medium relay unit 3. The heat medium relay unit 3 and the indoor units 2 are connected through the intermediate heat exchanger 15a and the intermediate heat exchanger 15b. That is, in the air-conditioning apparatus 100, the intermediate heat exchanger 15a and the intermediate heat exchanger 15b exchange heat between the heat source side refrigerant circulating in the refrigerant circuit A and the heat medium circulating in the heat medium circuit B.

[Operation Modes]

Various operation modes carried out by the air-conditioning apparatus 100 will be described. The air-conditioning apparatus 100 allows the indoor units 2 to perform a cooling operation or a heating operation on the basis of a command from each of the relevant indoor units 2. That is, the air-conditioning apparatus 100 allows all of the indoor units 2 to perform the same operation and also allows each of the indoor units 2 to perform different operations.

The operation modes carried out by the air-conditioning apparatus 100 includes the cooling only operation mode in which all of the operating indoor units 2 perform the cooling operation, the heating only operation mode in which all of the operating indoor units 2 perform the heating operation, the cooling main operation mode, which is one of the cooling and heating mixed operation mode, in which the cooling load is larger than the heating load, and a heating main operation mode, which is another one of the cooling and heating mixed operation mode, in which the heating load is larger than the cooling load. The various operation modes will be described below along with the flow of the heat source side refrigerant and that of the heat medium.

[Cooling Only Operation Mode]

Figure 3:
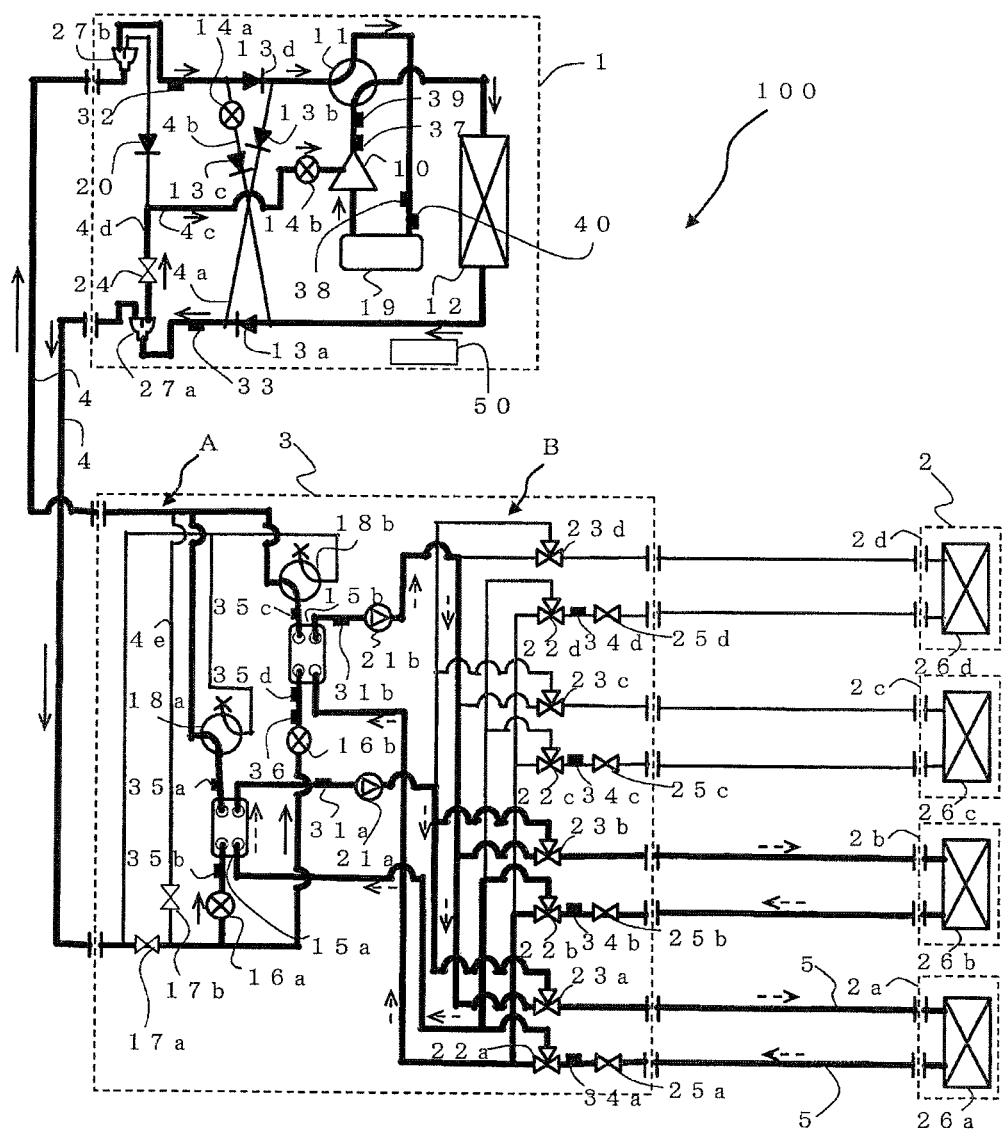
FIG. 3 is a refrigerant circuit diagram illustrating flows of refrigerants during a cooling only operation mode of the air-conditioning apparatus according to Embodiment 1 of the present invention.

FIG. 3 is a refrigerant circuit diagram illustrating the flows of the refrigerants during the cooling only operation mode of the air-conditioning apparatus 100. The cooling only operation mode will be described with an exemplary case in which cooling loads are generated only in the use side heat exchanger 26a and the use side heat exchanger 26b in FIG. 3. Note that, in FIG. 3, pipes depicted by thick lines indicate the pipes through which the refrigerants (the heat source side refrigerant and the heat medium) flow. Furthermore, the direction of flow of the heat source side refrigerant is indicated by solid-line arrows and the direction of flow of the heat medium is indicated by broken-line arrows in FIG. 3.

In the case of the cooling only operation mode illustrated in FIG. 3, the first refrigerant flow switching device 11 is switched such that the heat source side refrigerant that has been discharged from the compressor 10 flows into the heat source side heat exchanger 12 in the outdoor unit 1. In the heat medium relay unit 3, the pump 21a and the pump 21b are driven, the heat medium flow control device 25a and the heat medium flow control device 25b are opened, and the heat medium flow control device 25c and the heat medium flow control device 25d are fully closed such that the heat medium circulates between each of the intermediate heat exchanger 15a and the intermediate heat exchanger 15b and each of the use side heat exchanger 26a and the use side heat exchanger 26b.

The flow of the heat source side refrigerant in the refrigerant circuit A will be described first.

A low-temperature low-pressure refrigerant is compressed by the compressor 10 and is discharged as a high-temperature high-pressure gas refrigerant. The high-temperature high-pressure gas refrigerant that has been discharged from the compressor 10 flows into the heat source side heat exchanger 12 through the first refrigerant flow switching device 11. Then, the heat source side refrigerant is condensed and liquefied into a high-pressure liquid refrigerant while transferring heat to outdoor air in the heat source side heat exchanger 12. The high-pressure liquid refrigerant flows out of the heat source side heat exchanger 12 and passes through the check valve 13a. A portion of the high-pressure liquid refrigerant flows out of the outdoor unit 1 via the branching device 27a and flows into the heat medium relay unit 3 through the refrigerant pipe 4. The high-pressure liquid refrigerant that has flowed into the heat medium relay unit 3 is branched after passing through the opening and closing device 17a and is expanded into a low-temperature low-pressure two-phase refrigerant by the expansion device 16a and the expansion device 16b.

This two-phase refrigerant flows into each of the intermediate heat exchanger 15a and the intermediate heat exchanger 15b functioning as evaporators, cools the heat medium by removing heat from the heat medium circulating in the heat medium circuit B, and turns into a low-temperature low-pressure gas refrigerant. The gas refrigerant, which has flowed out of each of the intermediate heat exchanger 15a and the intermediate heat exchanger 15b, flows out of the heat medium relay unit 3 through the corresponding second refrigerant flow switching device 18a and second refrigerant flow switching device 18b, passes through the refrigerant pipe 4, and flows into the outdoor unit 1 again. The refrigerant that has flowed into the outdoor unit 1 passes through the branching device 27b, the check valve 13d, the first refrigerant flow switching device 11, and the accumulator 19, and is sucked into the compressor 10 again.

At this time, the opening degree (the opening area) of the expansion device 16a is controlled such that superheat (the degree of superheat), obtained as the difference between a temperature detected by the third temperature sensor 35a and a temperature detected by the third temperature sensor 35b, is constant. Similarly, the opening degree of the expansion device 16b is controlled such that superheat, obtained as the difference between a temperature detected by the third temperature sensor 35c and a temperature detected by the third temperature sensor 35d, is constant. Furthermore, the opening and closing device 17a is opened and the opening and closing device 17b is closed.

Figure 4:
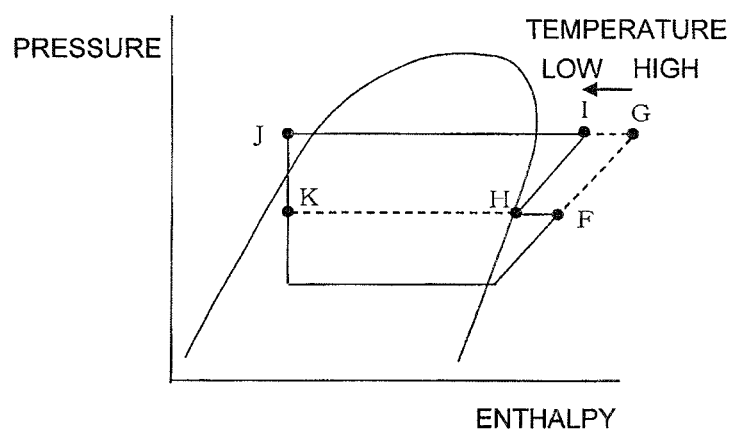
FIG. 4 is a P-h diagram (pressure-enthalpy diagram) illustrating a state transition of a heat source side refrigerant during the cooling only operation mode of the air-conditioning apparatus according to Embodiment 1 of the present invention.

An injection operation carried out by the air-conditioning apparatus 100 during the cooling only operation mode will be described. The injection operation during the above will be described with reference to FIG. 3 and FIG. 4. FIG. 4 is a P-h diagram (pressure-enthalpy diagram) illustrating a state transition of the heat source side refrigerant during the cooling only operation mode. In FIG. 4, the axis of ordinates indicates the pressure and the axis of abscissas indicates the enthalpy.

In the compressor 10, a low-temperature low-pressure gas refrigerant that has been drawn in from the suction port of the compressor 10 is introduced into the hermetic vessel. The low-temperature low-pressure gas refrigerant that has been filled in the hermetic vessel is sucked into the compression chamber (not shown). The internal volume of the compression chamber becomes smaller as rotation of 0 to 360 degrees is carried out by the motor (not shown). The internal refrigerant that has been sucked into the compression chamber is compressed and is increased in its pressure and temperature as the internal volume of the compression chamber is reduced. When the rotation angle of the motor reaches a preset angle, the opening port (formed in a portion of the compression chamber) is opened (the state at this moment is point F in FIG. 4) such that the inside of the compression chamber and the injection pipe 4c outside the compressor 10 are in communication with each other.

In the cooling only operation mode, the refrigerant that has been compressed in the compressor 10 is condensed and liquefied in the heat source side heat exchanger 12 and turns into a high-pressure liquid refrigerant (point J in FIG. 4), passes through the check valve 13a and reaches the branching device 27a. The opening and closing device 24 is opened such that this high-pressure liquid refrigerant is branched at the branching device 27a and is partially made to flow into the injection pipe 4c through the opening and closing device 24 and the branch pipe 4d. The refrigerant that has flowed into the injection pipe 4c is decompressed by the expansion device 14b and turns into a low-temperature intermediate-pressure two-phase refrigerant (point K in FIG. 4), and flows into the compression chamber through the opening port provided in the compression chamber of the compressor 10.

The intermediate-pressure gas refrigerant (point F in FIG. 4) and the low-temperature intermediate-pressure two-phase refrigerant (point K in FIG. 4) are mixed together in the compression chamber; accordingly the refrigerant temperature is reduced (point H in FIG. 4). With this configuration, the discharge temperature of the refrigerant that is discharged from the compressor 10 is reduced (point I in FIG. 4). The discharge temperature of the compressor 10 when no injection is carried out is point G in FIG. 4. Accordingly, it can be understood that the injection has reduced the discharge temperature from point G to point I. With the above operation, it is possible to reduce the discharge temperature of the compressor 10 and use the air-conditioning apparatus safely in a case in which a refrigerant, such as R32, whose discharge temperature from the compressor 10 becomes high, is used.

At this time, the refrigerant in the passage from the opening and closing device 24 of the branch pipe 4d to the backflow prevention device 20 is a high-pressure refrigerant, and the refrigerant that has returned to the outdoor unit 1 from the heat medium relay unit 3 through the refrigerant pipe 4 and that has reached the branching device 27b is a low-pressure refrigerant. The backflow prevention device 20 prevents the refrigerant from flowing from the branch pipe 4d to the branching device 27b. The function of the backflow prevention device 20 prevents the high-pressure refrigerant in the branch pipe 4d from being mixed with the low-pressure refrigerant in the branching device 27b.

Note that the opening and closing device 24 may be any device that is capable of switching the opening and closing of a passage and may be a solenoid valve or the like that can switch the opening and closing, as well as an electronic expansion valve or the like that can change the opening area. Note that the backflow prevention device 20 may be a check valve or may be a device capable of switching the opening and closing of a passage, such as a solenoid valve or the like that can switch the opening and closing or an electronic expansion valve or the like that can change the opening area. Furthermore, the expansion device 14a may be set with any opening degree since no refrigerant will flow therethrough. Additionally, the expansion device 14b is to be a component that can change the opening area, such as an electronic expansion valve. The opening area of the expansion device 14b is controlled so that the discharge temperature of the compressor 10 detected by the discharge-refrigerant temperature detection device 37 does not become excessively high and that the efficiency (COP) of the overall system is increased as much as possible during operation. Specific control method thereof will be described later.

Next, the flow of the heat medium in the heat medium circuit B will be described.

In the cooling only operation mode, both the intermediate heat exchanger 15a and the intermediate heat exchanger 15b transfer cooling energy of the heat source side refrigerant to the heat medium, and the cooled heat medium is made to flow through the pipes 5 with the pump 21a and the pump 21b. The heat medium that has flowed out of the pump 21a and the pump 21b after being pressurized therein flows through the second heat medium flow switching device 23a and the second heat medium flow switching device 23b and into the use side heat exchanger 26a and the use side heat exchanger 26b. The heat medium absorbs heat from the indoor air in the use side heat exchanger 26a and the use side heat exchanger 26b to cool the indoor space 7.

Then, the heat medium flows out of the use side heat exchanger 26a and the use side heat exchanger 26b and flows into the heat medium flow control device 25a and the heat medium flow control device 25b. At this time, with the function of each of the heat medium flow control device 25a and the heat medium flow control device 25b, the flow rate of the heat medium flowing into the corresponding one of the use side heat exchanger 26a and the use side heat exchanger 26b is controlled to a flow rate that is sufficient to cover the air conditioning load required indoors. The heat medium that has flowed out of the heat medium flow control device 25a and the heat medium flow control device 25b passes through the first heat medium flow switching device 22a and the first heat medium flow switching device 22b, respectively, flows into the intermediate heat exchanger 15a and the intermediate heat exchanger 15b, and is sucked into the pump 21a and the pump 21b again.

Note that in the pipes 5 of the use side heat exchanger 26, the heat medium flows in a direction from the second heat medium flow switching device 23 to the first heat medium flow switching device 22 through the heat medium flow control device 25. Furthermore, the air conditioning load required in the indoor space 7 can be covered by controlling the difference between the temperature detected by the first temperature sensor 31a or the temperature detected by the first temperature sensor 31b, and a temperature detected by the second temperature sensor 34 to be maintained at a target value. As for the temperature at the outlet of each intermediate heat exchanger 15, the temperature detected by either of the first temperature sensor 31a or the first temperature sensor 31b may be used. Alternatively, the mean temperature of the two may be used. At this time, each of the respective first heat medium flow switching device 22 and second heat medium flow switching device 23 is set to an intermediate opening degree so that passages that allow the heat medium to flow to both of the intermediate heat exchanger 15a and the intermediate heat exchanger 15b are established.

Upon carrying out the cooling only operation mode, there is no need to supply the heat medium to a use side heat exchanger 26 having no heat load (including thermo-off). Accordingly, the heat medium is made to not flow into the use side heat exchanger 26 by closing its passage with the corresponding heat medium flow control device 25. Referring to FIG. 3, the heat medium is supplied to the use side heat exchanger 26a and the use side heat exchanger 26b because these use side heat exchangers have heat loads. However, the use side heat exchanger 26c and the use side heat exchanger 26d do not have any heat load and the respective heat medium flow control device 25c and the heat medium flow control device 25d are fully closed. Furthermore, if a heat load is generated in the use side heat exchanger 26c or the use side heat exchanger 26d, the heat medium flow control device 25c or the heat medium flow control device 25d may be opened such that the heat medium is circulated therein.

[Heating Only Operation Mode]

Figure 5:
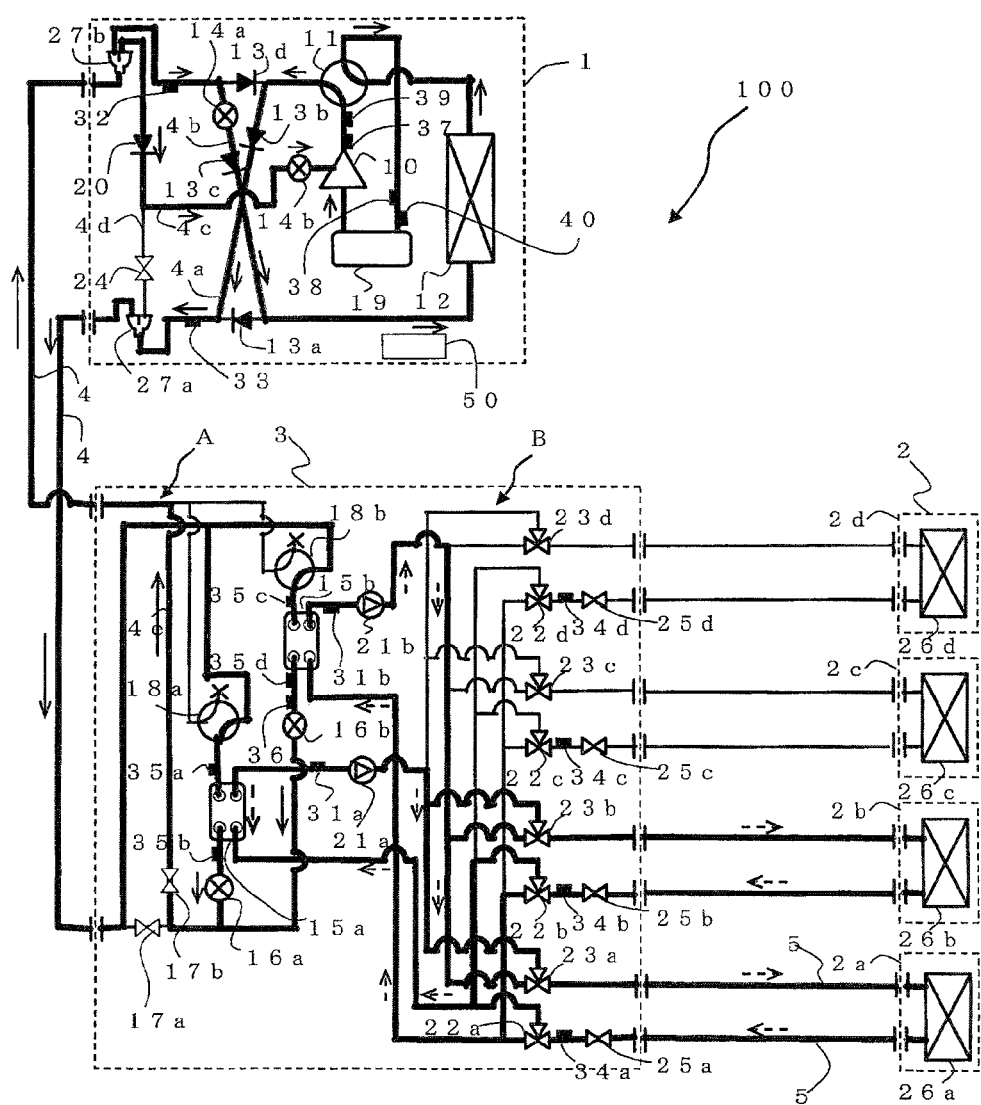
FIG. 5 is a refrigerant circuit diagram illustrating flows of the refrigerants during a heating only operation mode of the air-conditioning apparatus according to Embodiment 1 of the present invention.

FIG. 5 is a refrigerant circuit diagram illustrating the flows of the refrigerants in the heating only operation mode of the air-conditioning apparatus 100. The heating only operation mode will be described with an exemplary case in which heating loads are generated only in the use side heat exchanger 26a and the use side heat exchanger 26b in FIG. 5. Note that, in FIG. 5, pipes depicted by thick lines indicate the pipes through which the refrigerants (the heat source side refrigerant and the heat medium) flow. Furthermore, the direction of flow of the heat source side refrigerant is indicated by solid-line arrows and the direction of flow of the heat medium is indicated by broken-line arrows in FIG. 5.

In the heating only operation mode illustrated in FIG. 5, the first refrigerant flow switching device 11 is switched such that the heat source side refrigerant discharged from the compressor 10 flows into the heat medium relay unit 3 without being passed through the heat source side heat exchanger 12 in the outdoor unit 1. In the heat medium relay unit 3, the pump 21a and the pump 21b are driven, the heat medium flow control device 25a and the heat medium flow control device 25b are opened, and the heat medium flow control device 25c and the heat medium flow control device 25d are fully closed such that the heat medium circulates between each of the intermediate heat exchanger 15a and the intermediate heat exchanger 15b and each of the use side heat exchanger 26a and the use side heat exchanger 26b.

The flow of the heat source side refrigerant in the refrigerant circuit A will be described first.

A low-temperature low-pressure refrigerant is compressed by the compressor 10 and is discharged as a high-temperature high-pressure gas refrigerant. The high-temperature high-pressure gas refrigerant that has been discharged from the compressor 10 passes through the first refrigerant flow switching device 11, flows through the first connecting pipe 4a, passes through the check valve 13b and the branching device 27a, and flows out of the outdoor unit 1. The high-temperature high-pressure gas refrigerant that has flowed out of the outdoor unit 1 passes through the refrigerant pipe 4 and flows into the heat medium relay unit 3. The high-temperature high-pressure gas refrigerant that has flowed into the heat medium relay unit 3 is branched, passes through the second refrigerant flow switching device 18a and the second refrigerant flow switching device 18b, and flows into the intermediate heat exchanger 15a and the intermediate heat exchanger 15b, respectively.

The high-temperature high-pressure gas refrigerant that has flowed into each of the intermediate heat exchanger 15a and the intermediate heat exchanger 15b is condensed and liquefied into a high-pressure liquid refrigerant while transferring heat to the heat medium circulating in the heat medium circuit B. The liquid refrigerant flows out of each of the intermediate heat exchanger 15a and the intermediate heat exchanger 15b and is expanded into an intermediate-temperature intermediate-pressure two-phase refrigerant in the expansion device 16a and the expansion device 16b, respectively. This two-phase refrigerant passes through the opening and closing device 17b, flows out of the heat medium relay unit 3, passes through the refrigerant pipe 4, and flows into the outdoor unit 1 again. A portion of the refrigerant that has flowed into the outdoor unit 1 flows into the second connecting pipe 4b through the branching device 27b, passes through the expansion device 14a and is expanded by the expansion device 14a into a low-temperature low-pressure two-phase refrigerant, passes through the check valve 13c, and flows into the heat source side heat exchanger 12 functioning as an evaporator.

Then, the refrigerant that has flowed into the heat source side heat exchanger 12 absorbs heat from the outdoor air in the heat source side heat exchanger 12 and turns into a low-temperature low-pressure gas refrigerant. The low-temperature low-pressure gas refrigerant flows out of the heat source side heat exchanger 12, passes through the first refrigerant flow switching device 11 and the accumulator 19, and is sucked into the compressor 10 again.

At this time, the opening degree of the expansion device 16a is controlled such that subcooling (degree of subcooling), obtained as the difference between a value converted from a pressure detected by the pressure sensor 36 into a saturation temperature and a temperature detected by the third temperature sensor 35b, is constant. Similarly, the opening degree of the expansion device 16b is controlled such that subcooling, obtained as the difference between a value converted from a pressure detected by the pressure sensor 36 into a saturation temperature and a temperature detected by the third temperature sensor 35d, is constant. Furthermore, the opening and closing device 17a is closed and the opening and closing device 17b is opened. Note that when a temperature at the middle position of the intermediate heat exchangers 15 can be measured, the temperature at the middle position may be used instead of the pressure sensor 36. Accordingly, the system can be constructed inexpensively.

Figure 6:
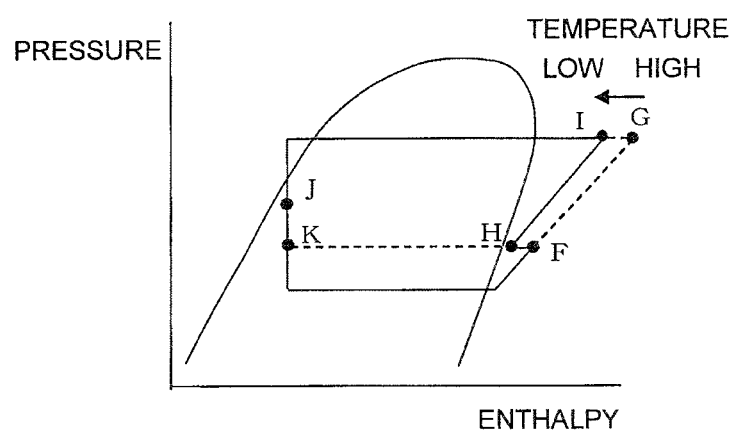
FIG. 6 is a P-h diagram (pressure-enthalpy diagram) illustrating a state transition of a heat source side refrigerant during the heating only operation mode of the air-conditioning apparatus according to Embodiment 1 of the present invention.

An injection operation carried out by the air-conditioning apparatus 100 during the heating only operation mode will be described. The injection operation during the above will be described with reference to FIG. 5 and FIG. 6. FIG. 6 is a P-h diagram (pressure-enthalpy diagram) illustrating a state transition of the heat source side refrigerant during the heating only operation mode. In FIG. 6, the axis of ordinates indicates the pressure and the axis of abscissas indicates the enthalpy.

In the compressor 10, a low-temperature low-pressure gas refrigerant that has been drawn in from the suction port of the compressor 10 is introduced into the hermetic vessel. The low-temperature low-pressure gas refrigerant that has been filled in the hermetic vessel is sucked into the compression chamber (not shown). The internal volume of the compression chamber becomes smaller as rotation of 0 to 360 degrees is carried out by the motor (not shown). The internal refrigerant that has been sucked into the compression chamber is compressed and is increased in its pressure and temperature as the internal volume of the compression chamber is reduced. When the rotation angle of the motor reaches a preset angle, the opening port (formed in a portion of the compression chamber) is opened (the state at this moment is point F in FIG. 6) such that the inside of the compression chamber and the injection pipe 4c outside the compressor 10 are in communication with each other.

In the heating only operation mode, a portion of the refrigerant that returns to the outdoor unit 1 from the heat medium relay unit 3 through the refrigerant pipe 4 flows into the expansion device 14a through the branching device 27b. With the function of the expansion device 14a, the pressure of the refrigerant upstream of the expansion device 14a is controlled to an intermediate-pressure state (point J in FIG. 6). A portion of the two-phase refrigerant that has been turned into the intermediate-pressure state by the expansion device 14a is branched at the branching device 27b and is made to flow into the branch pipe 4d. This refrigerant flows into the injection pipe 4c through the backflow prevention device 20 and is decompressed by the expansion device 14b into a low-temperature intermediate-pressure two-phase refrigerant with a slight decrease in pressure (point K in FIG. 6). Then, this refrigerant flows into the compression chamber from the opening port provided in the compression chamber of the compressor 10.

The intermediate-pressure gas refrigerant (point F in FIG. 6) and the low-temperature intermediate-pressure two-phase refrigerant (point K in FIG. 6) are mixed together in the compression chamber; accordingly the refrigerant temperature is reduced (point H in FIG. 6). As such, the discharge temperature of the refrigerant that is discharged from the compressor 10 is reduced (point I in FIG. 6). The discharge temperature of the compressor 10 when no injection is carried out is point G in FIG. 6. Accordingly, it can be understood that the injection has reduced the discharge temperature from point G to point I. With the above operation, it is possible to reduce the discharge temperature of the compressor 10 and use the air-conditioning apparatus safely in a case in which a refrigerant, such as R32, whose discharge temperature from the compressor 10 becomes high, is used.

A two-phase state refrigerant flows into the branching device 27b. As such, the branching device 27b is structured so that branching is carried out while the refrigerant is made to flow from the bottom to the top in order to divide the refrigerant uniformly. As such, the two-phase refrigerant is divided uniformly. Note that, at this time, the opening and closing device 24 is closed such that the high-pressured refrigerant from the branching device 27a is prevented from becoming mixed with the intermediate-pressured refrigerant that has passed through the backflow prevention device 20.

The configuration of each of the opening and closing device 24 and the backflow prevention device 20 is as described in the cooling only operation mode. Furthermore, the expansion device 14a is preferably a device that can change the opening area, such as an electronic expansion valve. If an electronic expansion valve is used, it will be possible to control the intermediate pressure upstream of the expansion device 14a to an optional pressure. The control of the discharge temperature with the expansion device 14b becomes stable when the opening degree of the expansion device 14a is controlled so that the intermediate-pressure detected by the intermediate pressure detection device 32 becomes a constant value, for example. However, the expansion device 14a is not limited to this device. On-off valves such as small-sized solenoid valves may be combined to allow selection of a plurality of opening areas. Alternatively, a capillary tube may create the intermediate pressure in accordance with the pressure loss of the refrigerant. Furthermore, although controllability will slightly drop, control may be carried out with the discharge temperature as its target. Additionally, the intermediate pressure detection device 32 may be a pressure sensor. Alternatively, the intermediate pressure may be computed by using a temperature sensor and by carrying out computation.

Furthermore, the expansion device 14b is to be a component that can change the opening area, such as an electronic expansion valve. The opening area of the expansion device 14b is controlled so that the discharge temperature of the compressor 10 detected by the discharge-refrigerant temperature detection device 37 does not become excessively high and that the efficiency (COP) of the overall system is increased as much as possible during operation. Specific control method thereof will be described later.

Note that in the heating only operation mode, the intermediate heat exchanger 15a and the intermediate heat exchanger 15b are both heating the heat medium. As such, if within the range allowing the expansion device 16a and the expansion device 16b to control the subcooling, then the pressure (intermediate pressure) of the refrigerant upstream of the expansion device 14a may be controlled to be higher. When the intermediate pressure is controlled to be higher, the pressure difference with the compression chamber can be made large. As such, it is possible to increase the amount of refrigerant injection into the compression chamber such that sufficient amount of injection to reduce the discharge temperature can be supplied to the compression chamber even in a case in which the outside air temperature is low.

The flow of the heat medium in the heat medium circuit B will be described next.

In the heating only operation mode, both of the intermediate heat exchanger 15a and the intermediate heat exchanger 15b transfer heating energy of the heat source side refrigerant to the heat medium, and the heated heat medium is made to flow through the pipes 5 with the pump 21a and the pump 21b. The heat medium that has flowed out of the pump 21a and the pump 21b after being pressurized therein flows through the second heat medium flow switching device 23a and the second heat medium flow switching device 23b and into the use side heat exchanger 26a and the use side heat exchanger 26b. Then, the heat medium transfers heat to the indoor air in the use side heat exchanger 26a and the use side heat exchanger 26b to carry out heating of the indoor space 7.

After that, the heat medium flows out of the use side heat exchanger 26a and the use side heat exchanger 26b and flows into the heat medium flow control device 25a and the heat medium flow control device 25b. At this time, with the function of each of the heat medium flow control device 25a and the heat medium flow control device 25b, the flow rate of the heat medium flowing into the corresponding one of the use side heat exchanger 26a and the use side heat exchanger 26b is controlled to a flow rate that is sufficient to cover the air conditioning load required indoors. The heat medium that has flowed out of the heat medium flow control device 25a and the heat medium flow control device 25b passes through the first heat medium flow switching device 22a and the first heat medium flow switching device 22b, respectively, flows into the intermediate heat exchanger 15a and the intermediate heat exchanger 15b, and is sucked into the pump 21a and the pump 21b again.

Note that in the pipes 5 of the use side heat exchanger 26, the heat medium flows in a direction from the second heat medium flow switching device 23 to the first heat medium flow switching device 22 through the heat medium flow control device 25. Furthermore, the air conditioning load required in the indoor space 7 can be covered by controlling the difference between the temperature detected by the first temperature sensor 31a or the temperature detected by the first temperature sensor 31b, and a temperature detected by the second temperature sensor 34 to be maintained at a target value. As for the temperature at the outlet of each intermediate heat exchanger 15, the temperature detected by either of the first temperature sensor 31a or the first temperature sensor 31b may be used. Alternatively, the mean temperature of the two may be used.

At this time, each of the respective first heat medium flow switching device 22 and second heat medium flow switching device 23 is set to an intermediate opening degree so that passages that allow the heat medium to flow to both of the intermediate heat exchanger 15a and the intermediate heat exchanger 15b are established. Although the use side heat exchanger 26a should essentially be controlled with the temperature difference between its inlet and its outlet, since the temperature of the heat medium on the inlet side of the use side heat exchanger 26 is substantially the same as the temperature detected by the first temperature sensor 31b, the first temperature sensor 31b can be used to reduce the number of temperature sensors and, accordingly, construct the system inexpensively. Note that, as is the case with the cooling only operation mode, the opening degree of each heat medium flow control device 25 may be controlled according to whether there is a heat load or not in the corresponding use side heat exchanger 26.

[Cooling Main Operation Mode]

Figure 7:
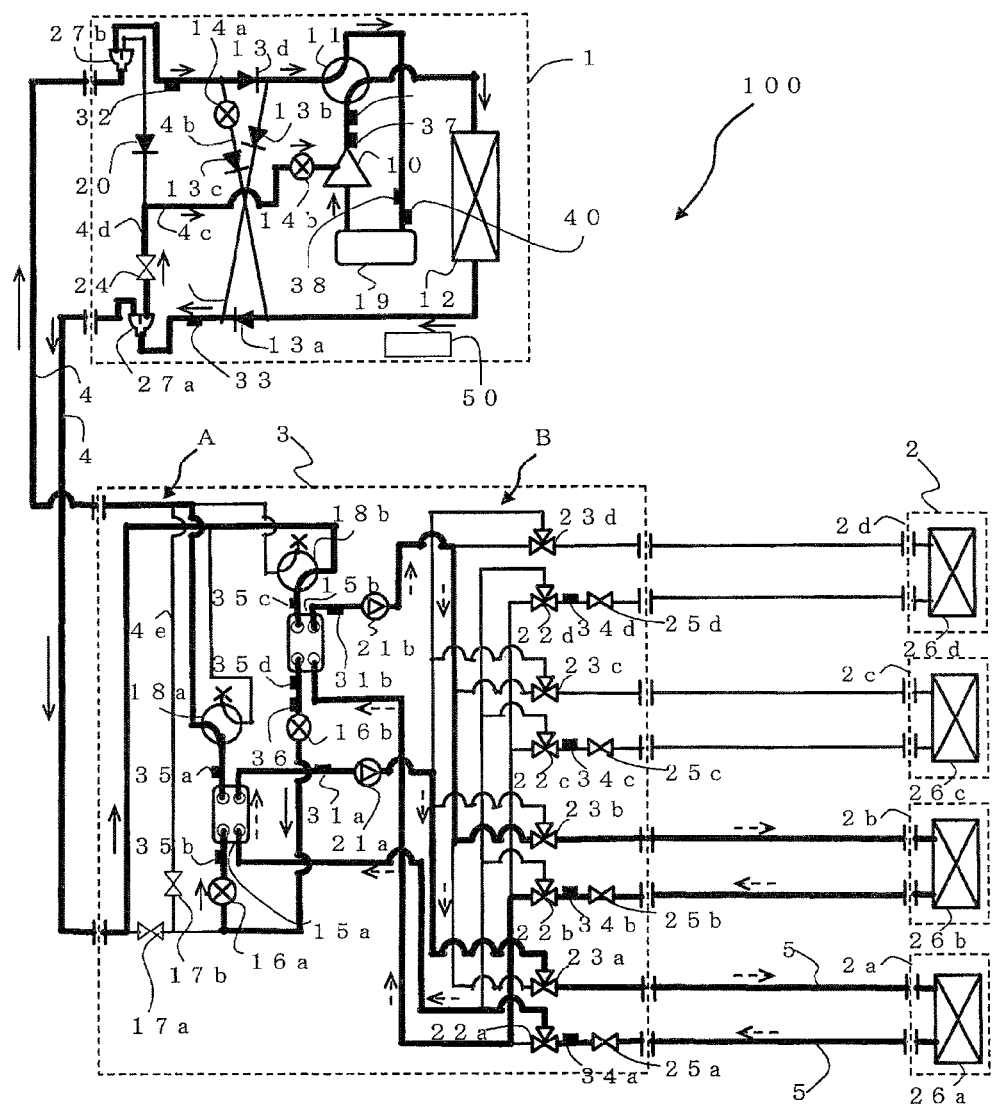
FIG. 7 is a refrigerant circuit diagram illustrating flows of the refrigerants during a cooling main operation mode of the air-conditioning apparatus according to Embodiment 1 of the present invention.

FIG. 7 is a refrigerant circuit diagram illustrating the flows of the refrigerants in the cooling main operation mode of the air-conditioning apparatus 100. The cooling main operation mode will be described with an exemplary case in which a cooling load is generated in the use side heat exchanger 26a and a heating load is generated in the use side heat exchanger 26b in FIG. 7. Note that, in FIG. 7, pipes depicted by thick lines indicate the pipes through which the refrigerants (the heat source side refrigerant and the heat medium) circulate. Furthermore, the direction of flow of the heat source side refrigerant is indicated by solid-line arrows and the direction of flow of the heat medium is indicated by broken-line arrows in FIG. 7.

In the cooling main operation mode illustrated in FIG. 7, the first refrigerant flow switching device 11 is switched such that the heat source side refrigerant discharged from the compressor 10 flows into the heat source side heat exchanger 12 in the outdoor unit 1. In the heat medium relay unit 3, the pump 21a and the pump 21b are driven, the heat medium flow control device 25a and the heat medium flow control device 25b are opened, and the heat medium flow control device 25c and the heat medium flow control device 25d are fully closed such that the heat medium circulates between the intermediate heat exchanger 15a and the use side heat exchanger 26a, and between the intermediate heat exchanger 15b and the use side heat exchanger 26b.

The flow of the heat source side refrigerant in the refrigerant circuit A will be described first.

A low-temperature low-pressure refrigerant is compressed by the compressor 10 and is discharged as a high-temperature high-pressure gas refrigerant. The high-temperature high-pressure gas refrigerant that has been discharged from the compressor 10 flows into the heat source side heat exchanger 12 through the first refrigerant flow switching device 11. The refrigerant is condensed into a two-phase refrigerant in the heat source side heat exchanger 12 while transferring heat to the outdoor air. The two-phase refrigerant flows out of the heat source side heat exchanger 12 and passes through the check valve 13a. A portion of the two-phase refrigerant flows out of the outdoor unit 1 via the branching device 27a and flows into the heat medium relay unit 3 through the refrigerant pipe 4. The two-phase refrigerant that has flowed into the heat medium relay unit 3 passes through the second refrigerant flow switching device 18b and flows into the intermediate heat exchanger 15b functioning as a condenser.

The two-phase refrigerant that has flowed into the intermediate heat exchanger 15b is condensed and liquefied into a liquid refrigerant while transferring heat to the heat medium circulating in the heat medium circuit B. The liquid refrigerant flows out of the intermediate heat exchanger 15b and is expanded into a low-pressure two-phase refrigerant in the expansion device 16b. This low-pressure two-phase refrigerant flows through the expansion device 16a and into the intermediate heat exchanger 15a functioning as an evaporator. The low-pressure two-phase refrigerant that has flowed into the intermediate heat exchanger 15a cools the heat medium by removing heat from the heat medium circulating in the heat medium circuit B and turns into a low-pressure gas refrigerant. The gas refrigerant flows out of the intermediate heat exchanger 15a, passes through the second refrigerant flow switching device 18a, flows out of the heat medium relay unit 3, passes through the refrigerant pipe 4, and flows into the outdoor unit 1 again. The refrigerant that has flowed into the outdoor unit 1 passes through the branching device 27b, the check valve 13d, the first refrigerant flow switching device 11, and the accumulator 19, and is sucked into the compressor 10 again.

At this time, the opening degree of the expansion device 16b is controlled such that superheat, obtained as the difference between a temperature detected by the third temperature sensor 35a and a temperature detected by the third temperature sensor 35b, is constant. Furthermore, the expansion device 16a is fully opened, the opening and closing device 17a is closed, and the opening and closing device 17b is closed. Note that, the opening degree of the expansion device 16b may be controlled such that subcooling, obtained as the difference between a value converted from a pressure detected by the pressure sensor 36 into a saturation temperature and a temperature detected by the third temperature sensor 35d, is constant. Alternatively, the expansion device 16b may be fully opened and the expansion device 16a may control the superheat or the subcooling.

An injection operation carried out by the air-conditioning apparatus 100 during the cooling main operation mode will be described. The injection operation during the above will be described with reference to FIG. 7 and FIG. 8. FIG. 8 is a P-h diagram (pressure-enthalpy diagram) illustrating a state transition of a heat source side refrigerant during the cooling main operation mode. In FIG. 8, the axis of ordinates indicates the pressure and the axis of abscissas indicates the enthalpy.

In the compressor 10, a low-temperature low-pressure gas refrigerant that has been drawn in from the suction port of the compressor 10 is introduced into the hermetic vessel. The low-temperature low-pressure gas refrigerant that has been filled in the hermetic vessel is sucked into the compression chamber (not shown). The internal volume of the compression chamber becomes smaller as rotation of 0 to 360 degrees is carried out by the motor (not shown). The internal refrigerant that has been sucked into the compression chamber is compressed and is increased in its pressure and temperature as the internal volume of the compression chamber is reduced. When the rotation angle of the motor reaches a preset angle, the opening port (formed in a portion of the compression chamber) is opened (the state at this moment is point F in FIG. 8) such that the inside of the compression chamber and the injection pipe 4c outside the compressor 10 are in communication with each other.

In the cooling main operation mode, the refrigerant that has been compressed in the compressor 10 is condensed in the heat source side heat exchanger 12 and turns into a high-pressure two-phase refrigerant (point J in FIG. 8), passes through the check valve 13a and reaches the branching device 27a. The opening and closing device 24 is opened such that this high-pressure two-phase refrigerant is branched at the branching device 27a and is partially made to flow into the injection pipe 4c through the opening and closing device 24 and the branch pipe 4d. The refrigerant that has flowed into the injection pipe 4c is decompressed by the expansion device 14b and turns into a low-temperature intermediate-pressure two-phase refrigerant (point K in FIG. 8), and flows into the compression chamber through the opening port provided in the compression chamber of the compressor 10.

The intermediate-pressure gas refrigerant (point F in FIG. 8) and the low-temperature intermediate-pressure two-phase refrigerant (point K in FIG. 8) are mixed together in the compression chamber; accordingly the refrigerant temperature is reduced (point H in FIG. 8). As such, the discharge temperature of the refrigerant that is discharged from the compressor 10 is reduced (point I in FIG. 8). The discharge temperature of the compressor 10 when no injection is carried out is point G in FIG. 8. Accordingly, it can be understood that the injection has reduced the discharge temperature from point G to point I. With the above operation, it is possible to reduce the discharge temperature of the compressor 10 and use the air-conditioning apparatus safely in a case in which a refrigerant, such as R32, whose discharge temperature from the compressor 10 becomes high, is used.

A two-phase state refrigerant flows into the branching device 27a. As such, the branching device 27a is structured so that branching is carried out while the refrigerant is made to flow from the bottom to the top in order to divide the refrigerant uniformly. As such, the two-phase refrigerant is divided uniformly.

At this time, the refrigerant in the passage from the opening and closing device 24 of the branch pipe 4d to the backflow prevention device 20 is a high-pressure refrigerant, and the refrigerant that has returned to the outdoor unit 1 from the heat medium relay unit 3 through the refrigerant pipe 4 and that has reached the branching device 27b is a low-pressure refrigerant. The backflow prevention device 20 prevents the refrigerant from flowing from the branch pipe 4d to the branching device 27b. The function of the backflow prevention device 20 prevents the high-pressure refrigerant in the branch pipe 4d from being mixed with the low-pressure refrigerant in the branching device 27b.

The configuration of each of the opening and closing device 24 and the backflow prevention device 20 is as described in the cooling only operation mode. Furthermore, the expansion device 14a may be set with any opening degree since no refrigerant will flow therethrough. Furthermore, the expansion device 14b is to be a component that can change the opening area, such as an electronic expansion valve. The opening area of the expansion device 14b is controlled so that the discharge temperature of the compressor 10 detected by the discharge-refrigerant temperature detection device 37 does not become excessively high and that the efficiency (COP) of the overall system is increased as much as possible during operation. Specific control method thereof will be described later.

The flow of the heat medium in the heat medium circuit B will be described next.

In the cooling main operation mode, the intermediate heat exchanger 15b transfers heating energy of the heat source side refrigerant to the heat medium, and the heated heat medium is made to flow through the pipes 5 with the pump 21b. Furthermore, in the cooling main operation mode, the intermediate heat exchanger 15a transfers cooling energy of the heat source side refrigerant to the heat medium, and the cooled heat medium is made to flow through the pipes 5 with the pump 21a. The heat medium that has flowed out of the pump 21a and the pump 21b after being pressurized therein flows through the second heat medium flow switching device 23a and the second heat medium flow switching device 23b and into the use side heat exchanger 26a and the use side heat exchanger 26b.

The heat medium transfers heat to the indoor air in the use side heat exchanger 26b to carry out heating of the indoor space 7. Furthermore, the heat medium absorbs heat from the indoor air in the use side heat exchanger 26a to carry out cooling of the indoor space 7. At this time, with the function of each of the heat medium flow control device 25a and the heat medium flow control device 25b, the flow rate of the heat medium flowing into the corresponding one of the use side heat exchanger 26a and the use side heat exchanger 26b is controlled to a flow rate that is sufficient to cover the air conditioning load required indoors. The heat medium that has passed through the use side heat exchanger 26b with a slight decrease of temperature passes through the heat medium flow control device 25b and the first heat medium flow switching device 22b, flows into the intermediate heat exchanger 15b, and is sucked into the pump 21b again. The heat medium that has passed through the use side heat exchanger 26a with a slight increase of temperature passes through the heat medium flow control device 25a and the first heat medium flow switching device 22a, flows into the intermediate heat exchanger 15a, and is sucked into the pump 21a again.

Meanwhile, with the functions of the first heat medium flow switching devices 22 and the second heat medium flow switching devices 23, the hot heat medium and the cold heat medium are introduced to their respective use side heat exchangers 26 having a heating load or a cooling load without being mixed. Note that in the pipes 5 of both the heating side and the cooling side of the use side heat exchangers 26, the heat medium flows in a direction from the second heat medium flow switching device 23 to the first heat medium flow switching device 22 through the heat medium flow control device 25. Furthermore, the air conditioning load required in the indoor space 7 can be covered by controlling the temperature difference between the temperature detected by the first temperature sensor 31b and the temperature detected by the second temperature sensor 34 to be maintained at a target value as for the heating side, and can be covered by controlling the temperature difference between the temperature detected by the second temperature sensor 34 and the temperature detected by the first temperature sensor 31a to be maintained at a target value as for the cooling side.

Note that, as is the case with the cooling only operation mode and the heating only operation mode, the opening degree of each heat medium flow control device 25 may be controlled according to whether there is a heat load or not in the corresponding use side heat exchanger 26.

[Heating Main Operation Mode]

Figure 9:
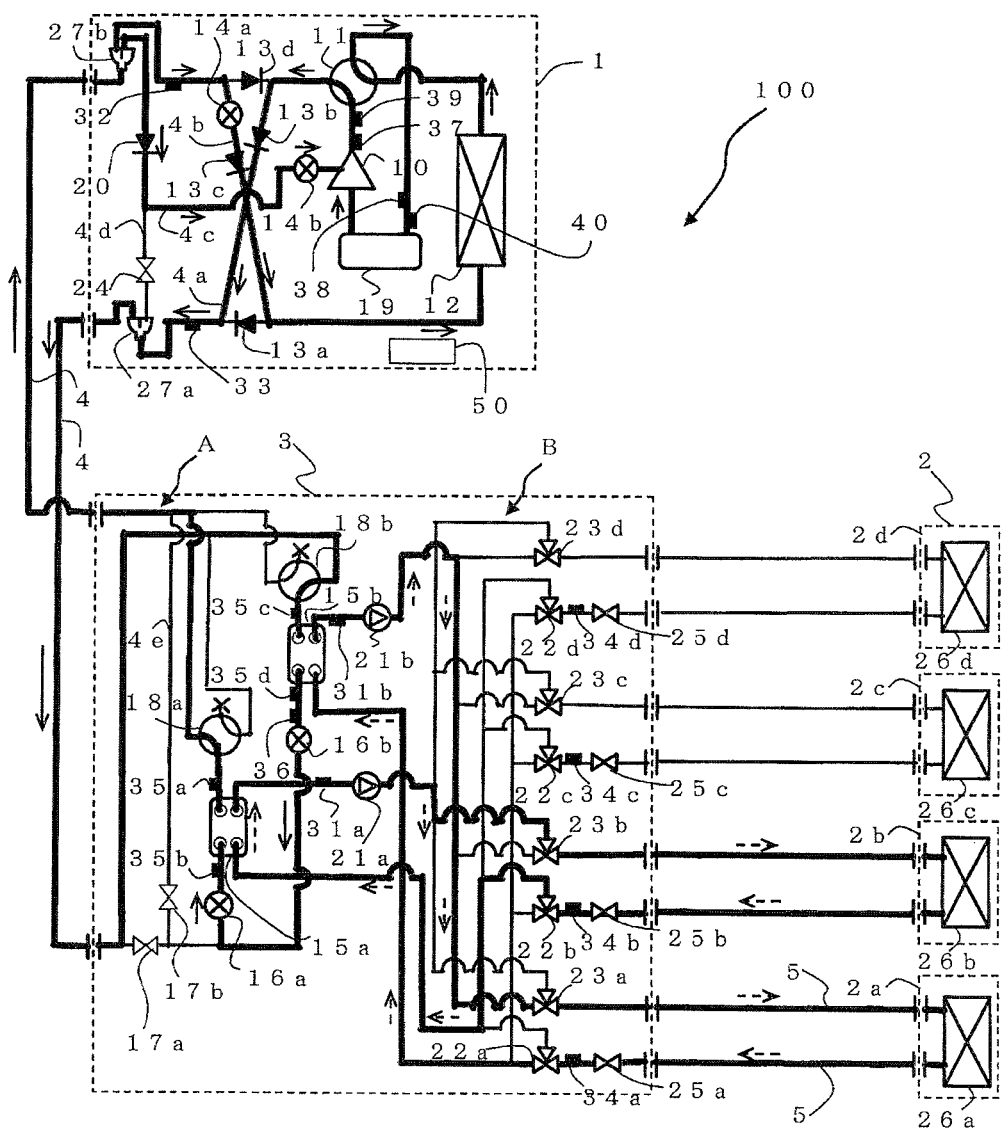
FIG. 9 is a refrigerant circuit diagram illustrating flows of refrigerants during a heating main operation mode of the air-conditioning apparatus according to Embodiment 1 of the present invention.

FIG. 9 is a refrigerant circuit diagram illustrating the flows of the refrigerants in the heating main operation mode of the air-conditioning apparatus 100. The heating main operation mode will be described with an exemplary case in which a heating load is generated in the use side heat exchanger 26a and a cooling load is generated in the use side heat exchanger 26b in FIG. 9. Note that, in FIG. 9, pipes depicted by thick lines indicate the pipes through which the refrigerants (the heat source side refrigerant and the heat medium) circulate. Furthermore, the direction of flow of the heat source side refrigerant is indicated by solid-line arrows and the direction of flow of the heat medium is indicated by broken-line arrows in FIG. 9.

In the heating main operation mode illustrated in FIG. 9, the first refrigerant flow switching device 11 is switched such that the heat source side refrigerant discharged from the compressor 10 flows into the heat medium relay unit 3 without being passed through the heat source side heat exchanger 12 in the outdoor unit 1. In the heat medium relay unit 3, the pump 21a and the pump 21b are driven, the heat medium flow control device 25a and the heat medium flow control device 25b are opened, and the heat medium flow control device 25c and the heat medium flow control device 25d are fully closed such that the heat medium circulates between the intermediate heat exchanger 15a and the use side heat exchanger 26b, and between the intermediate heat exchanger 15b and the use side heat exchanger 26a.

The flow of the heat source side refrigerant in the refrigerant circuit A will be described first.

A low-temperature low-pressure refrigerant is compressed by the compressor 10 and is discharged as a high-temperature high-pressure gas refrigerant. The high-temperature high-pressure gas refrigerant that has been discharged from the compressor 10 passes through the first refrigerant flow switching device 11, flows through the first connecting pipe 4a, passes through the check valve 13b and the branching device 27a, and flows out of the outdoor unit 1. The high-temperature high-pressure gas refrigerant that has flowed out of the outdoor unit 1 passes through the refrigerant pipe 4 and flows into the heat medium relay unit 3. The high-temperature high-pressure gas refrigerant that has flowed into the heat medium relay unit 3 passes through the second refrigerant flow switching device 18b and flows into the intermediate heat exchanger 15b functioning as a condenser.

The gas refrigerant that has flowed into the intermediate heat exchanger 15b is condensed and liquefied into a liquid refrigerant while transferring heat to the heat medium circulating in the heat medium circuit B. The liquid refrigerant flows out of the intermediate heat exchanger 15b and is expanded into an intermediate-pressure two-phase refrigerant in the expansion device 16b. This intermediate-pressure two-phase refrigerant flows through the expansion device 16a and into the intermediate heat exchanger 15a functioning as an evaporator. The intermediate-pressure two-phase refrigerant that has flowed into the intermediate heat exchanger 15a is evaporated by removing heat from the heat medium circulating in the heat medium circuit B and cools the heat medium. The intermediate-pressure two-phase refrigerant flows out of the intermediate heat exchanger 15a, passes through the second refrigerant flow switching device 18a, flows out of the heat medium relay unit 3, passes through the refrigerant pipe 4, and flows into the outdoor unit 1 again.

A portion of the refrigerant that has flowed into the outdoor unit 1 flows into the second connecting pipe 4b through the branching device 27b, passes through the expansion device 14a and is expanded by the expansion device 14a into a low-temperature low-pressure two-phase refrigerant, passes through the check valve 13c, and flows into the heat source side heat exchanger 12 functioning as an evaporator. Then, the refrigerant that has flowed into the heat source side heat exchanger 12 absorbs heat from the outdoor air in the heat source side heat exchanger 12 and turns into a low-temperature low-pressure gas refrigerant. The low-temperature low-pressure gas refrigerant flows out of the heat source side heat exchanger 12, passes through the first refrigerant flow switching device 11 and the accumulator 19, and is sucked into the compressor 10 again.

At this time, the opening degree of the expansion device 16b is controlled such that subcooling, obtained as the difference between a value converted from a pressure detected by the pressure sensor 36 into a saturation temperature and a temperature detected by the third temperature sensor 35b, is constant. Furthermore, the expansion device 16a is fully opened, the opening and closing device 17a is closed, and the opening and closing device 17b is closed. Note that the expansion device 16b may be fully opened and the expansion device 16a may control the subcooling.

An injection operation carried out by the air-conditioning apparatus 100 during the heating main operation mode will be described. The injection operation during the above will be described with reference to FIG. 9 and FIG. 10. FIG. 10 is a P-h diagram (pressure-enthalpy diagram) illustrating a state transition of a heat source side refrigerant during the heating main operation mode. In FIG. 10, the axis of ordinates indicates the pressure and the axis of abscissas indicates the enthalpy.

In the compressor 10, a low-temperature low-pressure gas refrigerant that has been drawn in from the suction port of the compressor 10 is introduced into the hermetic vessel. The low-temperature low-pressure gas refrigerant that has been filled in the hermetic vessel is sucked into the compression chamber (not shown). The internal volume of the compression chamber becomes smaller as rotation of 0 to 360 degrees is carried out by the motor (not shown). The internal refrigerant that has been sucked into the compression chamber is compressed and is increased in its pressure and temperature as the internal volume of the compression chamber is reduced. When the rotation angle of the motor reaches a preset angle, the opening port (formed in a portion of the compression chamber) is opened (the state at this moment is point F in FIG. 10) such that the inside of the compression chamber and the injection pipe 4c outside the compressor 10 are in communication with each other.

In the heating main operation mode, a portion of the refrigerant that returns to the outdoor unit 1 from the heat medium relay unit 3 through the refrigerant pipe 4 flows into the expansion device 14a through the branching device 27b. With the function of the expansion device 14a, the pressure of the refrigerant upstream of the expansion device 14a is controlled to an intermediate-pressure state (point J in FIG. 10). A portion of the two-phase refrigerant that has been turned into the intermediate-pressure state by the expansion device 14a is branched at the branching device 27b and is made to flow into the branch pipe 4d. This refrigerant flows into the injection pipe 4c through the backflow prevention device 20 and is decompressed by the expansion device 14b into a low-temperature intermediate-pressure two-phase refrigerant with a slight decrease in pressure (point K in FIG. 10). Then, this refrigerant flows into the compression chamber from the opening port provided in the compression chamber of the compressor 10.

The intermediate-pressure gas refrigerant (point F in FIG. 10) and the low-temperature intermediate-pressure two-phase refrigerant (point K in FIG. 10) are mixed together in the compression chamber; accordingly the refrigerant temperature is reduced (point H in FIG. 10). As such, the discharge temperature of the refrigerant that is discharged from the compressor 10 is reduced (point I in FIG. 10). The discharge temperature of the compressor 10 when no injection is carried out is point G in FIG. 10. Accordingly, it can be understood that the injection has reduced the discharge temperature from point G to point I. With the above operation, it is possible to reduce the discharge temperature of the compressor 10 and use the air-conditioning apparatus safely in a case in which a refrigerant, such as R32, whose discharge temperature from the compressor 10 becomes high, is used.

Note that a two-phase state refrigerant flows into the branching device 27b. As such, the branching device 27b is structured so that branching is carried out while the refrigerant is made to flow from the bottom to the top in order to divide the refrigerant uniformly. As such, the two-phase refrigerant is divided uniformly. Note that, at this time, the opening and closing device 24 is closed such that the high-pressured refrigerant from the branching device 27a is prevented from becoming mixed with the intermediate-pressured refrigerant that has passed through the backflow prevention device 20.

The configuration of each of the opening and closing device 24 and the backflow prevention device 20 is as described in the cooling only operation mode. Furthermore, the expansion device 14a is preferably a device that can change the opening area, such as an electronic expansion valve. If an electronic expansion valve is used, it will be possible to control the intermediate pressure upstream of the expansion device 14a to an optional pressure. The control of the discharge temperature with the expansion device 14b becomes stable when the opening degree of the expansion device 14a is controlled so that the intermediate-pressure detected by the intermediate pressure detection device 32 becomes a constant value, for example. However, the expansion device 14a is not limited to this device. On-off valves such as small-sized solenoid valves may be combined to allow selection of a plurality of opening areas. Alternatively, a capillary tube may create the intermediate pressure in accordance with the pressure loss of the refrigerant. Furthermore, although controllability will slightly drop, control may be carried out with the discharge temperature as its target. Additionally, the intermediate pressure detection device 32 may be a pressure sensor. Alternatively, the intermediate pressure may be computed by using a temperature sensor and by carrying out computation.

Furthermore, the expansion device 14b is to be a component that can change the opening area, such as an electronic expansion valve. The opening area of the expansion device 14b is controlled so that the discharge temperature of the compressor 10 detected by the discharge-refrigerant temperature detection device 37 does not become excessively high and that the efficiency (COP) of the overall system is increased as much as possible during operation. Specific control method thereof will be described later.

Note that in the heating main operation mode, the heat medium needs to be cooled in the intermediate heat exchanger 15b. As such, the pressure (intermediate pressure) of the refrigerant upstream of the expansion device 14a cannot be controlled to be particularly high. If the intermediate pressure cannot be made high, then the amount of refrigerant injection into the compression chamber will drop. Accordingly, the amount of decrease in the discharge temperature will drop. However, since the heat medium needs to be prevented from freezing, when the outside air temperature is low (for example, outside air temperature of −5 degrees C. or lower), the heating main operation is disallowed from being used. When the outside air temperature is high, there occurs no problem since the discharge temperature does not have to be particularly high and the injection amount also does not need to be that much large. The expansion device 14a allows the heat medium to be cooled in the intermediate heat exchanger 15b. The expansion device 14a sets the pressure to the intermediate pressure, which allows an injection amount sufficient to reduce the discharge temperature to be supplied to the compression chamber, and, thus, allows a safe operation to be carried out.

The flow of the heat medium in the heat medium circuit B will be described next.

In the heating main operation mode, the intermediate heat exchanger 15b transfers heating energy of the heat source side refrigerant to the heat medium, and the heated heat medium is made to flow through the pipes 5 with the pump 21b. Furthermore, in the heating main operation mode, the intermediate heat exchanger 15a transfers cooling energy of the heat source side refrigerant to the heat medium, and the cooled heat medium is made to flow through the pipes 5 with the pump 21a. The heat medium that has flowed out of the pump 21a and the pump 21b after being pressurized therein flows through the second heat medium flow switching device 23a and the second heat medium flow switching device 23b and into the use side heat exchanger 26a and the use side heat exchanger 26b.

The heat medium absorbs heat from the indoor air in the use side heat exchanger 26b to carry out cooling of the indoor space 7. Furthermore, the heat medium transfers heat to the indoor air in the use side heat exchanger 26a to carry out heating of the indoor space 7. At this time, with the function of each of the heat medium flow control device 25a and the heat medium flow control device 25b, the flow rate of the heat medium flowing into the corresponding one of the use side heat exchanger 26a and the use side heat exchanger 26b is controlled to a flow rate that is sufficient to cover the air conditioning load required indoors. The heat medium that has passed through the use side heat exchanger 26b with a slight increase of temperature passes through the heat medium flow control device 25b and the first heat medium flow switching device 22b, flows into the intermediate heat exchanger 15a, and is sucked into the pump 21a again. The heat medium that has passed through the use side heat exchanger 26a with a slight decrease of temperature passes through the heat medium flow control device 25a and the first heat medium flow switching device 22a, flows into the intermediate heat exchanger 15b, and is sucked into the pump 21b again.

Meanwhile, with the functions of the first heat medium flow switching devices 22 and the second heat medium flow switching devices 23, the hot heat medium and the cold heat medium are introduced to their respective use side heat exchangers 26 having a heating load or a cooling load without being mixed. Note that in the pipes 5 of both the heating side and the cooling side of the use side heat exchangers 26, the heat medium flows in a direction from the second heat medium flow switching device 23 to the first heat medium flow switching device 22 through the heat medium flow control device 25. Furthermore, the air conditioning load required in the indoor space 7 can be covered by controlling the temperature difference between the temperature detected by the first temperature sensor 31b and the temperature detected by the second temperature sensor 34 to be maintained at a target value as for the heating side, and can be covered by controlling the temperature difference between the temperature detected by the second temperature sensor 34 and the temperature detected by the first temperature sensor 31a to be maintained at a target value as for the cooling side.

Note that, as is the case with the cooling only operation mode, the heating only operation mode, and the cooling main operation mode, the opening degree of each heat medium flow control device 25 may be controlled according to whether there is a heat load or not in the corresponding use side heat exchanger 26.

[Refrigerant Pipe 4]

As described above, the air-conditioning apparatus 100 according to Embodiment 1 is provided with several operation modes. In these operation modes, the heat source side refrigerant flows through the refrigerant pipes 4 connecting the outdoor unit 1 and the heat medium relay unit 3.

[Pipe 5]

In the several operation modes carried out by the air-conditioning apparatus 100 according to Embodiment 1, a heat medium, such as water or antifreeze, flows through the pipes 5 connecting the heat medium relay unit 3 and the indoor units 2.

[Control of Injection Flow Rate]

Figure 11:
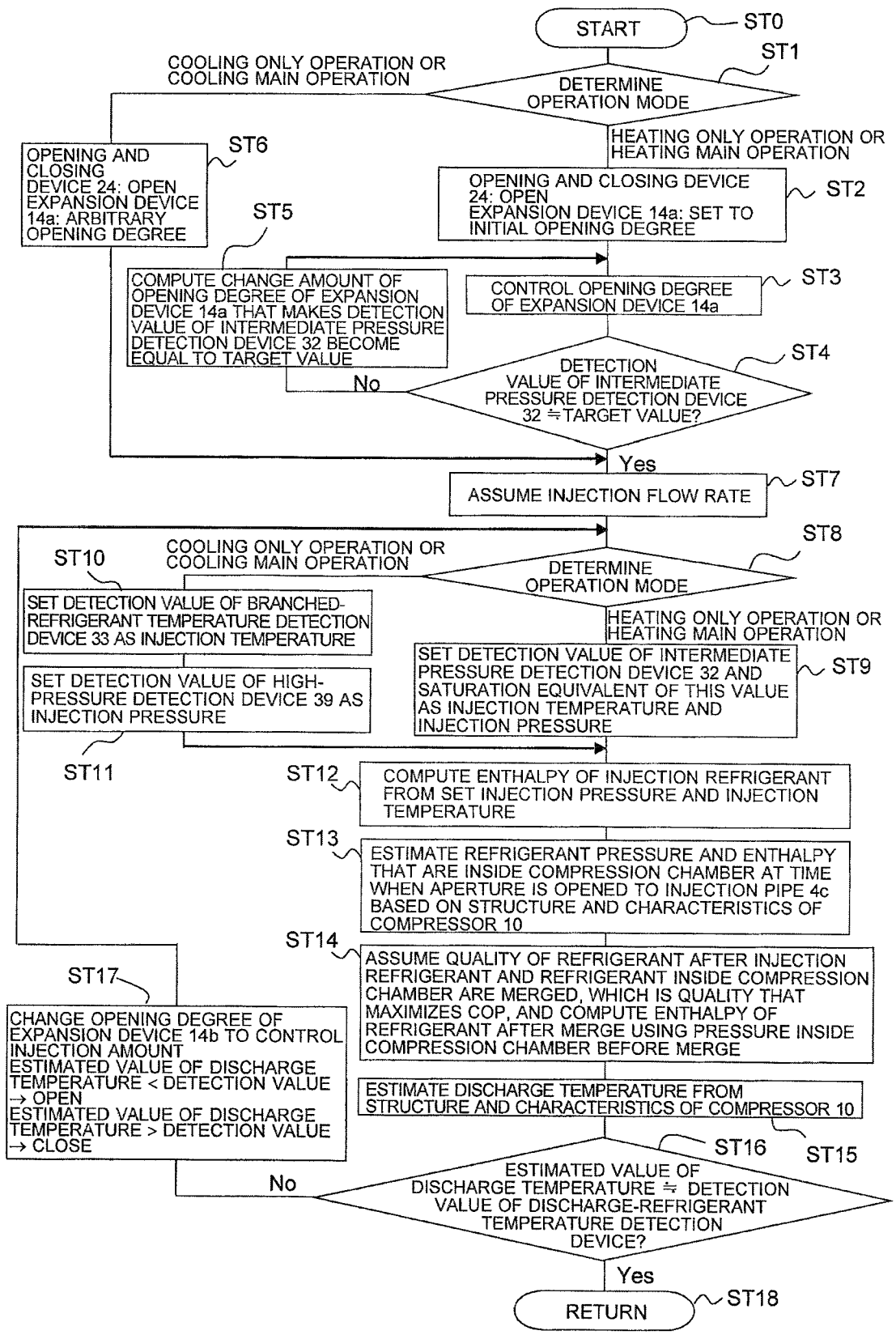
FIG. 11 is a flowchart illustrating a flow of an injection control process carried out by the air-conditioning apparatus according Embodiment 1 of the present invention.

FIG. 11 is a flowchart illustrating a flow of an injection control process carried out by the air-conditioning apparatus 100. An injection control operation of the air-conditioning apparatus 100 will be described with reference to FIG. 11. The flow of the injection control process that turns the resultant refrigerant after merging of the injection refrigerant and the refrigerant inside the compression chamber of the compressor 10 into a designated quality is illustrated in the flow chart of FIG. 11. Note that while the injection is carried out to reduce the discharge temperature of the compressor 10, in the air-conditioning apparatus 100, a target quality value that is a target value of the injection control that takes into consideration both reduction of discharge temperature and improvement of COP is preset. As such, by carrying out the control in accordance with the target value, both advantages can be obtained.

When the process is started (ST0), the controller 50 carries out determination of the operation mode (ST1). When the operation mode is determined to be the heating only operation or the heating main operation (ST1; Heating only operation or heating main operation), the controller 50 opens the opening and closing device 24 and sets the opening degree of the expansion device 14a to an initial opening degree that has been set in advance (ST2). Next, the controller 50 successively carries out control of the opening degree of the expansion device 14a (ST3). Then, the controller 50 determines whether the detection value of the intermediate pressure detection device 32 and the target value are approximately equal to each other (ST4).

When the detection value of the intermediate pressure detection device 32 and the target value are not equal to each other (ST4; No), the controller 50 computes an opening-degree change amount of the expansion device 14a that makes the detection value of the intermediate pressure detection device 32 become equal to the target value (ST5). After that, the controller 50 repeatedly carries out the process from the opening-degree control of the expansion device 14a (ST3). When the detection value of the intermediate pressure detection device 32 and the target value are equal to each other (ST4; Yes), the controller assumes the injection flow rate (ST7).

On the other hand, when the operation mode is determined to be the cooling only operation or the cooling main operation (ST1; Cooling only operation or cooling main operation), the controller 50 closes the opening and closing device 24 and sets the opening degree of the expansion device 14a to an arbitrary opening degree (ST6). After that, the controller assumes the injection flow rate (ST7).

Next, the controller 50 carries out determination of the operation mode again (ST8). When the controller 50 determines that the operation mode is the heating only operation or the heating main operation (ST8; Heating only operation or heating main operation), the controller 50 sets the detection value of the intermediate pressure detection device 32 and the saturation equivalent to this value as the injection temperature and the injection pressure (ST9). On the other hand, when the operation mode is determined to be the cooling only operation or the cooling main operation (ST8; Cooling only operation or cooling main operation), the controller 50 sets the detection value of the branched-refrigerant temperature detection device 33 as the injection temperature (ST10) and sets the detection value of the high-pressure detection device 39 as the injection pressure (ST11).

From the next step, the controller 50 carries out the same process regardless of the operation mode. First, the controller 50 computes the enthalpy of the injection refrigerant from the set injection pressure and the injection temperature (ST12). Next, the controller 50 estimates the refrigerant pressure and the enthalpy that are inside the compression chamber at the time when the opening port of the compression chamber is opened to the injection pipe 4c due to the structure and characteristics of the compressor 10 (ST13). Then, the controller 50 assumes the quality of the refrigerant after the injection refrigerant and the refrigerant inside the compression chamber are merged, which is the quality that maximizes the COP, and computes the enthalpy of the refrigerant after the merge using the pressure inside the compression chamber before the merge (ST14). Furthermore, the controller 50 estimates the discharge temperature from the structure and characteristics of the compressor 10 (ST15). The controller 50 determines whether the estimated value of the discharge temperature and the detection value of the discharge-refrigerant temperature detection device 37 are approximately equal to each other (ST16).

When the estimated value of the discharge temperature and the detection value of the discharge-refrigerant temperature detection device 37 are approximately equal to each other (ST16; Yes), then the controller 50 completes the process (ST18). When the estimated value of the discharge temperature and the detection value of the discharge-refrigerant temperature detection device 37 are not approximately equal to each other, the controller 50 changes the opening degree of the expansion device 14b to control the injection amount (ST19). At this time, when the estimated value of the discharge temperature is smaller than the detection value of the discharge-refrigerant temperature detection device 37, the expansion device 14b is opened, that is, the injection amount is increased to reduce the discharge temperature, and when the estimated value of the discharge temperature is larger than the detection value of the discharge-refrigerant temperature detection device 37, the expansion device 14b is closed, that is, the injection amount is decreased to increase the discharge temperature. The controller 50 then repeats the process from ST8.

Note that it has been described with the flowchart described above that the refrigerant pressure and the enthalpy inside the compression chamber at the time when the opening port of the compression chamber is opened to the injection pipe 4c is estimated from the structure and characteristics of the compressor 10. That is, since the relationship between the pressure and volume inside the compression chamber before the compression and the relationship between the pressure and volume inside the compression chamber when the injection port is opened are expressed by the polytropic compression equation that is commonly known in the field of thermodynamics, the above means the intermediate pressure is computed by prestoring the volume inside the compression chamber in a state in which the opening port of the compressor is opened to the injection pipe 4c, a value related to this volume, the ratio of the volume to the stroke volume of the compressor 10, and the like, and by using the pressure inside the compression chamber before the compression that is detected by the suction-refrigerant pressure detection device 40.

Furthermore, it has been described here that the quality, which is the state quantity of the refrigerant after the injection refrigerant and the refrigerant inside the compression chamber of the compressor 10 have been merged, is assumed and that the discharge temperature, which is the state quantity of the refrigerant after the compression, is observed to correct the assumed quality, such that control is carried out to create a state in which the discharge temperature, which is the target value, is at or below the temperature limit and in which the COP is maximized. It is known that the COP becomes higher when the merged refrigerant after the injection is in a slightly wet state and that the COP becomes the highest when the quality ranges from 0.9 to 0.99. However, the compression load of the compressor 10 becomes large when compressing a refrigerant in a wet state. Accordingly, the refrigerant after the merge may be controlled to be in a saturated state or in a state slightly dryer than the saturated state, such as a degree of superheat of 1 degrees C.

Furthermore, other than the quality of the refrigerant immediately after the merge and the degree of superheat of the refrigerant immediately after the merge, the enthalpy of the refrigerant immediately after the merge may be used as the state quantity of the refrigerant immediately after the merge. Additionally, other than the discharge temperature, the enthalpy of the discharge refrigerant may be used as the state quantity of the discharge refrigerant.

Note that carrying out control to maximize the COP means carrying out control so that the electric power consumption of the compressor 10 becomes as small as possible, means carrying out control so that the heating capacity or the cooling capacity of the intermediate heat exchanger 15 that is the load-side heat exchanger becomes as large as possible, or means carrying out control so that the COP, obtained by dividing the heating capacity or the cooling capacity by the electric power consumption of the compressor 10, becomes as large as possible.

The above method allows the air-conditioning apparatus 100 to carry out control that maximizes the COP as much as possible while maintaining the discharge temperature of the compressor 10 to an appropriate value.

In the air-conditioning apparatus 100, when the use side heat exchangers 26 only have a heating load alone or a cooling load alone, the corresponding first heat medium flow switching devices 22 and the corresponding second heat medium flow switching devices 23 are set to a medium opening degree such that the heat medium flows into both of the intermediate heat exchanger 15a and the intermediate heat exchanger 15b. Consequently, since both the intermediate heat exchanger 15a and the intermediate heat exchanger 15b can be used for the heating operation or the cooling operation, the heat transfer area can be increased, and, accordingly, an efficient heating operation or cooling operation can be carried out.

Furthermore, when a heating load and a cooling load co-exist at the same time in the use side heat exchangers 26, each of the respective indoor units 2 will be capable of freely carrying out the heating operation or the cooling operation by switching the first heat medium flow switching device 22 and the second heat medium flow switching device 23 corresponding to the use side heat exchanger 26 which performs the heating operation to the passage connected to the intermediate heat exchanger 15b for heating, and by switching the first heat medium flow switching device 22 and the second heat medium flow switching device 23 corresponding to the use side heat exchanger 26 which performs the cooling operation to the passage connected to the intermediate heat exchanger 15a for cooling.

Note that each of the first heat medium flow switching devices 22 and the second heat medium flow switching devices 23 described in Embodiment 1 may be any component that can switch passages, for example, a three-way valve capable of switching between three passages or a combination of two on-off valves and the like switching between two passages. Alternatively, for each of the first heat medium flow switching devices 22 and the second heat medium flow switching devices 23, components, such as a stepping motor driven mixing valve, capable of changing flow rates of three passages or combination of two electronic expansion valves capable of changing flow rates of two passages may be used. In this case, water hammer caused when a flow passage is suddenly opened or closed can be prevented. Furthermore, in Embodiment 1, while a description has been made of an exemplary case in which the heat medium flow control devices 25 each include a two-way valve, each of the heat medium flow control devices 25 may include a control valve having a three-way passage which is disposed with a bypass pipe that bypasses the corresponding use side heat exchanger 26.

Furthermore, as each of the use side heat medium flow control devices 25, a stepping-motor-driven type device that is capable of controlling the flow rate in the passage may be preferably used and a two-way valve or a three-way valve with a closed end may be used. Alternatively, as each of the heat medium flow control devices 25, a component that closes and opens a two-way passage, such as an on-off valve, may be used while ON/OFF operations are repeated to control an average flow rate.

Furthermore, while each second refrigerant flow switching device 18 has been described as a four-way valve, the device is not limited to a four-way valve. The device may be configured so that the refrigerant flows in the same manner using a plurality of two-way flow switching valves or three-way flow switching valves.

Additionally, it goes without saying that a similar effect can be achieved when only a single use side heat exchanger 26 and a single heat medium flow control device 25 are connected. Moreover, it is needless to say that no problem will arise even if a plurality of the intermediate heat exchanger 15 and a plurality of the expansion device 16 acting in the same manner are disposed. Furthermore, while a description has been made of an exemplary case in which the heat medium flow control devices 25 are installed in the heat medium relay unit 3, the arrangement is not limited to this and each heat medium flow control device 25 may be disposed in the corresponding indoor unit 2. The heat medium relay unit 3 and the indoor unit 2 may be provided in separate casings.

As regards the heat medium, for example, brine (antifreeze), water, a liquid mixture of brine and water, or a liquid mixture of water and an additive with high anticorrosive effect can be used. Accordingly, in the air-conditioning apparatus 100, even if the heat medium leaks into the indoor space 7 through the indoor unit 2, because the used heat medium is highly safe, contribution to improvement of safety can be made.

Furthermore, although on the heat source side heat exchanger 12 and the use side heat exchangers 26a to 26d are typically mounted an air-sending device in which blowing of air facilitates condensation and evaporation, the arrangement is not limited to this and a panel heater using radiation can be used as the use side heat exchangers 26a to 26d. A water-cooled heat exchanger which transfers heat using water or antifreeze can be used as the heat source side heat exchanger 12. Any component structured to transfer or remove heat may be used therefor.

In the Embodiment 1, while a description has been made of an exemplary case in which there are four use side heat exchangers 26a to 26d, any number of the use side heat exchangers 26a to 26d may be connected. Furthermore, a description has been made of an exemplary case in which there are two intermediate heat exchangers 15, namely, the intermediate heat exchangers 15a and 15b. As a matter of course, the arrangement is not limited to this case and any number of intermediate heat exchangers may be disposed as long as it is configured to carry out cooling and/or heating of the heat medium. Furthermore, the number of each of the pumps 21a and that of pumps 21b is not limited to one. A plurality of pumps having a small capacity may be connected in parallel. In Embodiment 1, while a description has been made of an exemplary case in which the accumulator 19 is included in the air-conditioning apparatus 100, the accumulator 19 may be omitted.

Furthermore, a description of an exemplary system has been made herein illustrating a case in which the outdoor unit 1 houses the compressor 10, the first refrigerant flow switching device 11, the heat source side heat exchanger 12, the expansion device 14a, the expansion device 14b, the opening and closing devices 17, and the backflow prevention device 20; the indoor units 2 each house an use side heat exchanger 26; the heat medium relay unit 3 houses the intermediate heat exchangers 15 and the expansion devices 16; the outdoor unit 1 and the heat medium relay unit 3 are connected with a pair of pipes therebetween to circulate the refrigerant between the outdoor unit 1 and the heat medium relay unit 3; each of the indoor units 2 and the heat medium relay unit 3 are connected therebetween with a pair of pipes to circulate the heat medium between the indoor units 2 and the heat medium relay unit 3; and heat is exchanged between the refrigerant and the heat medium in the intermediate heat exchangers 15; however, the system is not limited to this arrangement.

For example, the air-conditioning apparatus 100 may be applied to a direct expansion system including the outdoor unit 1 that houses the compressor 10, the first refrigerant flow switching device 11, the heat source side heat exchanger 12, the expansion device 14a, the expansion device 14b, the opening and closing devices 17, and the backflow prevention device 20; the indoor units 2 that each houses a load side heat exchanger that exchanges heat between the air in the conditioned space and the refrigerant, and the expansion device 16; and a relay unit that is formed in a casing separate from that of the outdoor unit 1 and the indoor units 2, in which the outdoor unit 1 and the relay unit are connected with a pair of pipes, the indoor units 2 and the relay unit are connected with a pair of pipes, and refrigerant is circulated between the outdoor unit 1 and the indoor units 2 through the relay unit such that the cooling only operation, the heating only operation, the cooling main operation, and the heating main operation can be carried out. The same advantages can be obtained with this direct expansion system.

As above, the air-conditioning apparatus 100 according to Embodiment 1 is capable of injecting the refrigerant into the compression chamber of the compressor 10 that is in the midst of a compression process and is capable of carrying out control such that the discharge temperature does not become excessively high regardless of the operation mode, even in a case in which a refrigerant, such as R32, whose discharge temperature on discharge from the compressor 10 becomes high, is used. Furthermore, the air-conditioning apparatus 100 can optimally control the injection flow rate to the compressor 10. Accordingly, the system COP is increased and contribution to energy saving can be achieved.

Second Embodiment

Figure 12:
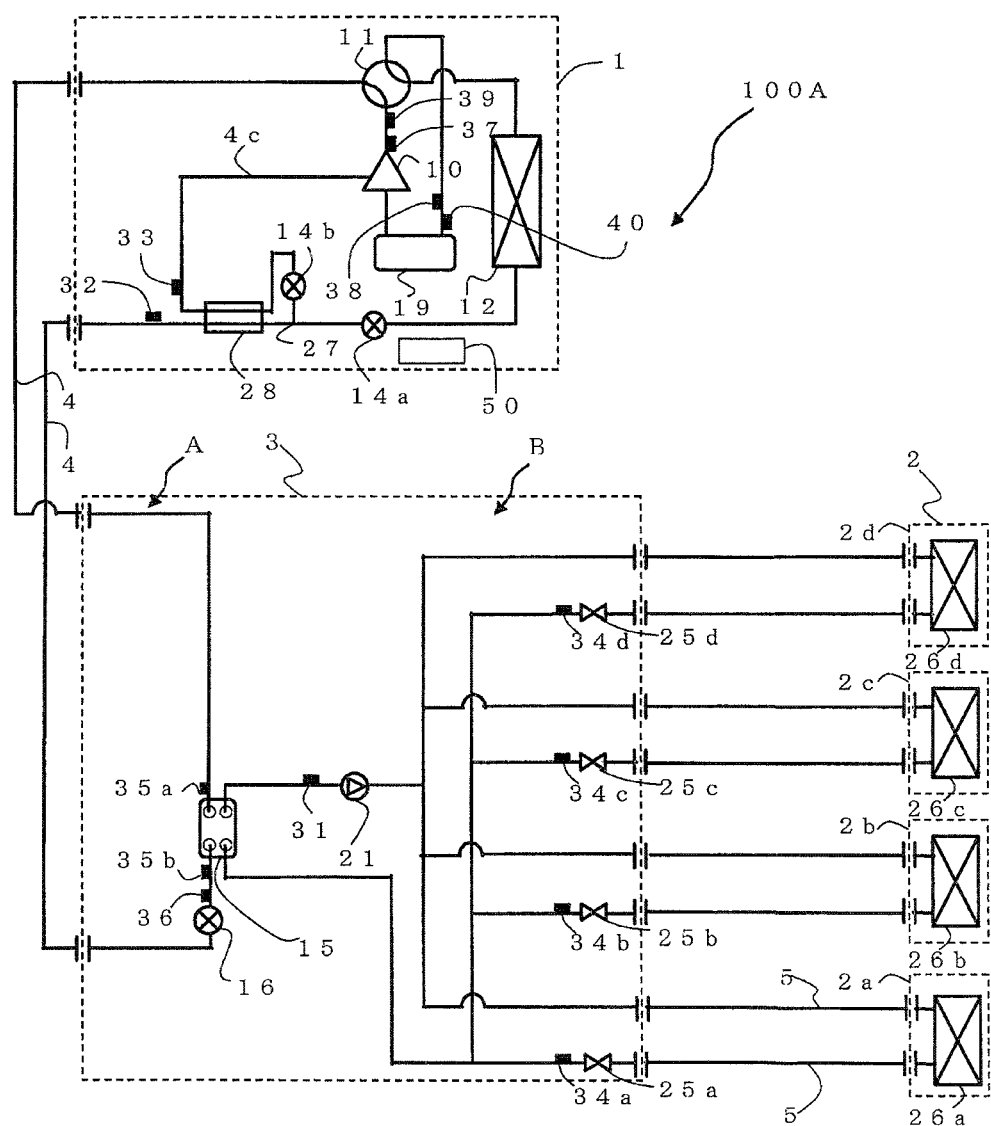
FIG. 12 is a schematic circuit diagram illustrating an exemplary circuit configuration of an air-conditioning apparatus according to Embodiment 2 of the present invention.

FIG. 12 is a schematic circuit diagram illustrating an exemplary circuit configuration of the air-conditioning apparatus (hereinafter, referred to as an air-conditioning apparatus 100A) according to Embodiment 2. The air-conditioning apparatus 100A will be described with reference to FIG. 12. Note that Embodiment 2 mainly describes the differences with the above described Embodiment 1. Descriptions of the portions that are the same as Embodiment 1, such as the refrigerant circuit configuration, are omitted therein.

As illustrated in FIG. 12, the air-conditioning apparatus 100A differs from the air-conditioning apparatus 100 according to Embodiment 1 in that there are no check valves 13a to 13d, no first connecting pipe 4a, no the second connecting pipe 4b, no branch pipe 4d, no opening and closing device 24, no backflow prevention device 20, no opening and closing devices 17, and no second refrigerant flow switching devices 18, and in that there is a single branching device 27, a single intermediate heat exchanger 15, a single expansion device 16, and a single pump 21. That is, the air-conditioning apparatus 100A is not provided with a cooling and heating mixed operation mode.

As illustrated in FIG. 12, in the air-conditioning apparatus 100A, a refrigerant-to-refrigerant heat exchanger 28 is disposed upstream, upstream during the heating operation, of the expansion device 14a. The branching device 27 is provided in a passage between the refrigerant-to-refrigerant heat exchanger 28 and the expansion device 14a. Furthermore, the refrigerant that has been branched off in the branching device 27 passes through the expansion device 14b and the refrigerant-to-refrigerant heat exchanger 28, passes through the injection pipe 4c, and is injected into the compression chamber of the compressor 10 through the opening port provided in the compression chamber of the compressor 10. At this time, in the refrigerant-to-refrigerant heat exchanger 28, the refrigerant that has been throttled by the expansion device 14b is made to cool the refrigerant in the mainstream by itself. The above configuration allows the heating capacity under low outside air to be improved and allows the operating efficiency (COP) to be increased. The operation modes carried out by the air-conditioning apparatus 100 will now be described respectively.

[Cooling Operation Mode]

Figure 13:
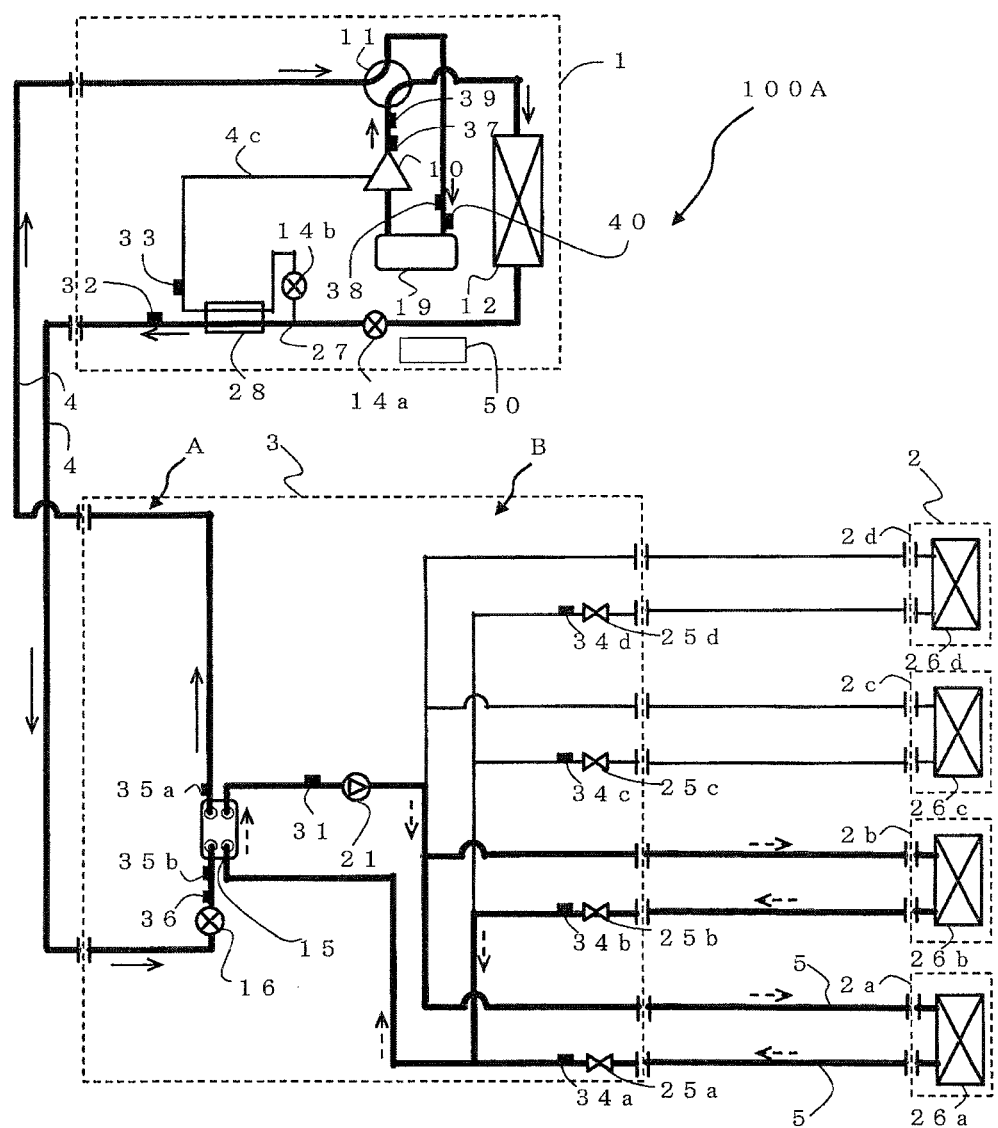
FIG. 13 is a refrigerant circuit diagram illustrating flows of the refrigerants during a cooling operation mode of the air-conditioning apparatus according to Embodiment 1 of the present invention.

FIG. 13 is a refrigerant circuit diagram illustrating flows of the refrigerants in a cooling operation mode of the air-conditioning apparatus 100A. The cooling operation mode will be described with an exemplary case in which cooling loads are generated only in the use side heat exchanger 26a and the use side heat exchanger 26b in FIG. 13. Furthermore, in FIG. 13, pipes indicated by thick lines indicate the pipes through which the refrigerants (the heat source side refrigerant and the heat medium) flow. Additionally, the direction of flow of the heat source side refrigerant is indicated by solid-line arrows and the direction of flow of the heat medium is indicated by broken-line arrows in FIG. 13.

In the case of the cooling operation mode illustrated in FIG. 13, the first refrigerant flow switching device 11 is switched such that the heat source side refrigerant that has been discharged from the compressor 10 flows into the heat source side heat exchanger 12 in the outdoor unit 1. In the heat medium relay unit 3, the pump 21 is driven, the heat medium flow control device 25a and the heat medium flow control device 25b are opened, and the heat medium flow control device 25c and the heat medium flow control device 25d are fully closed such that the heat medium circulates between the intermediate heat exchanger 15 and each of the use side heat exchanger 26a and the use side, heat exchanger 26b.

The flow of the heat source side refrigerant in the refrigerant circuit A will be described first.

A low-temperature low-pressure refrigerant is compressed by the compressor 10 and is discharged as a high-temperature high-pressure gas refrigerant. The high-temperature high-pressure gas refrigerant that has been discharged from the compressor 10 flows into the heat source side heat exchanger 12 through the first refrigerant flow switching device 11. Then, the heat source side refrigerant is condensed and liquefied into a high-pressure liquid refrigerant while transferring heat to outdoor air in the heat source side heat exchanger 12. A portion of the high-pressure liquid refrigerant flowing out of the heat source side heat exchanger 12 flows out of the outdoor unit 1 through the expansion device 14a that is in a fully opened state, the branching device 27, and the refrigerant-to-refrigerant heat exchanger 28 and flows into the heat medium relay unit 3 through the refrigerant pipe 4.

The high-pressure liquid refrigerant that has flowed into the heat medium relay unit 3 is expanded by the expansion device 16 and turns into a low-temperature low-pressure two-phase refrigerant and flows into the intermediate heat exchanger 15 functioning as an evaporator. The refrigerant that has flowed into the intermediate heat exchanger 15 cools the heat medium by removing heat from the heat medium circulating in the heat medium circuit B and turns into a low-temperature low-pressure gas refrigerant. Then, the gas refrigerant flows out of the intermediate heat exchanger 15, flows out of the heat medium relay unit 3, and flows into the outdoor unit 1 again through the refrigerant pipe 4. The refrigerant that has flowed into the outdoor unit 1 passes through the first refrigerant flow switching device 11 and the accumulator 19 and is sucked into the compressor 10 again.

During the cooling operation, the expansion device 14b is fully closed or is set to a small opening degree allowing no refrigerant to flow therethrough. As such, no injection is carried out to the compression chamber of the compressor 10 through the injection pipe 4c. If the refrigerant is made to flow in the injection pipe 4c during the cooling operation, a portion of the energy of the refrigerant compressed in the compressor 10 will not be conveyed to the intermediate heat exchanger 15 that is on the load side. Accordingly, there will be a lack of cooling capacity. Accordingly, the cooling capacity becomes larger and the operating efficiency becomes higher when no injection is carried out and the entire refrigerant is made to flow into the intermediate heat exchanger 15 during the cooling operation.

The flow of the heat medium in the heat medium circuit B will be described next.

In the cooling operation mode, the intermediate heat exchanger 15 transfers cooling energy of the heat source side refrigerant to the heat medium, and the cooled heat medium is made to flow through the pipes 5 with the pump 21. The heat medium flows out of the pump 21 after being pressurized therein and flows into the use side heat exchanger 26a and the use side heat exchanger 26b. The heat medium absorbs heat from the indoor air in the use side heat exchanger 26a and the use side heat exchanger 26b to cool the indoor space 7.

Then, the heat medium flows out of the use side heat exchanger 26a and the use side heat exchanger 26b and flows into the heat medium flow control device 25a and the heat medium flow control device 25b. At this time, with the function of each of the heat medium flow control device 25a and the heat medium flow control device 25b, the flow rate of the heat medium flowing into the corresponding one of the use side heat exchanger 26a and the use side heat exchanger 26b is controlled to a flow rate that is sufficient to cover the air conditioning load required indoors. The heat medium flows out of each of the heat medium flow control device 25a and the heat medium flow control device 25b and flows into the intermediate heat exchanger 15 through the pipe 5 and is sucked into the pump 21 again.

Note that the air conditioning load required in the indoor space 7 can be covered by controlling the difference between a temperature detected by the first temperature sensor 31 and a temperature detected by the second temperature sensor 34 to be maintained at a target value.

Upon carrying out the cooling operation mode, there is no need to supply the heat medium to a use side heat exchanger 26 having no heat load (including thermo-off). Accordingly, the heat medium is made to not flow into the use side heat exchanger 26 by closing its passage with the corresponding heat medium flow control device 25. Referring to FIG. 13, the heat medium is supplied to the use side heat exchanger 26a and the use side heat exchanger 26b because these use side heat exchangers have heat loads. However, the use side heat exchanger 26c and the use side heat exchanger 26d do not have any heat load and the respective heat medium flow control device 25c and the heat medium flow control device 25d are fully closed. Furthermore, if a heat load is generated in the use side heat exchanger 26c or the use side heat exchanger 26d, the heat medium flow control device 25c or the heat medium flow control device 25d may be opened such that the heat medium is circulated therein.

[Heating Operation Mode]

Figure 14:
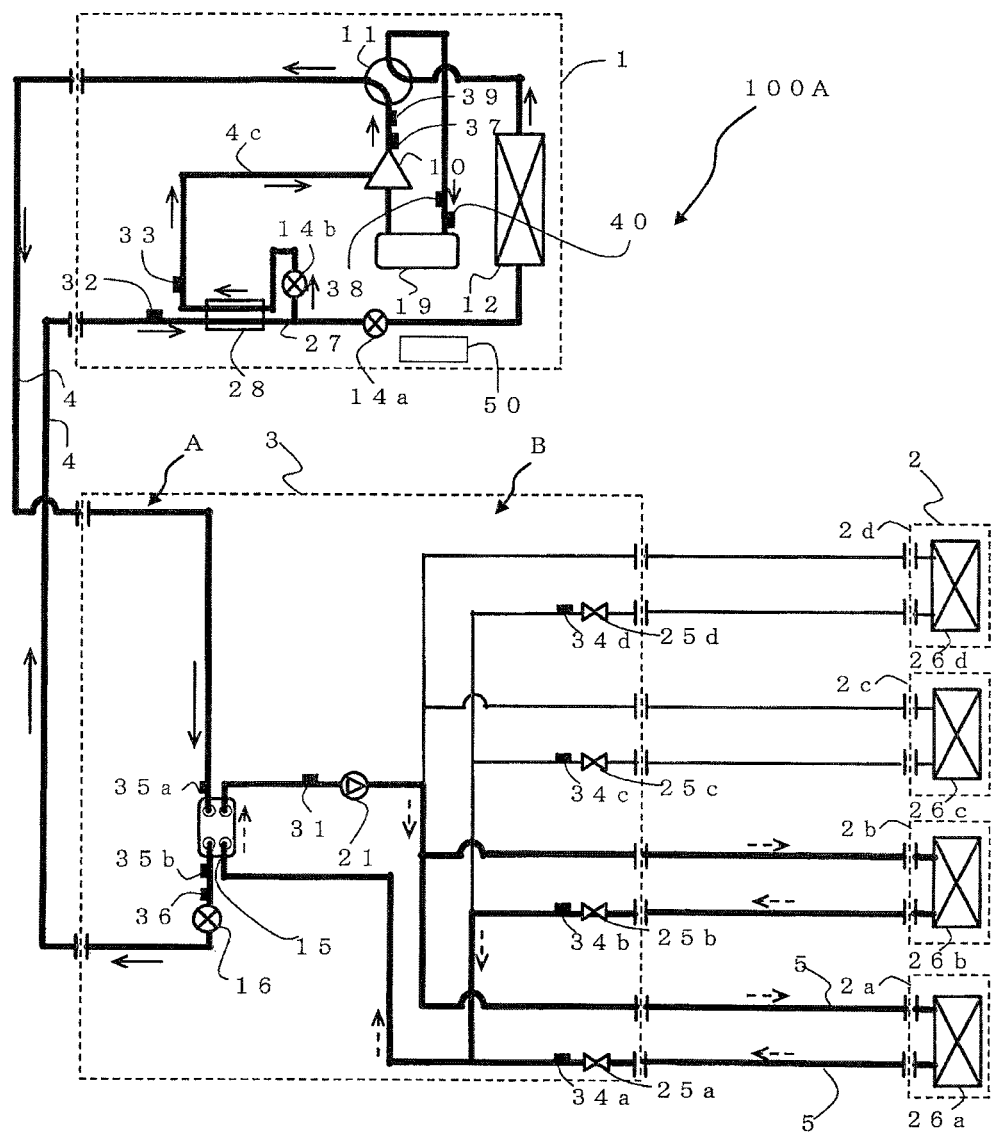
FIG. 14 is a refrigerant circuit diagram illustrating flows of the refrigerants during a heating operation mode of the air-conditioning apparatus according to Embodiment 2 of the present invention.

FIG. 14 is a refrigerant circuit diagram illustrating a flow of the refrigerant in a heating operation mode of the air-conditioning apparatus 100A. The heating operation mode will be described with an exemplary case in which cooling loads are generated only in the use side heat exchanger 26a and the use side heat exchanger 26b in FIG. 14. Note that, in FIG. 14, pipes depicted by thick lines indicate the pipes through which the refrigerants (the heat source side refrigerant and the heat medium) flow. Furthermore, the direction of flow of the heat source side refrigerant is indicated by solid-line arrows and the direction of flow of the heat medium is indicated by broken-line arrows in FIG. 14.

In the heating operation mode illustrated in FIG. 14, the first refrigerant flow switching device 11 is switched such that the heat source side refrigerant discharged from the compressor 10 flows into the heat medium relay unit 3 without being passed through the heat source side heat exchanger 12 in the outdoor unit 1. In the heat medium relay unit 3, the pump 21 is driven, the heat medium flow control device 25a and the heat medium flow control device 25b are opened, and the heat medium flow control device 25c and the heat medium flow control device 25d are fully closed such that the heat medium circulates between the intermediate heat exchanger 15 and each of the use side heat exchanger 26a and the use side heat exchanger 26b.

The flow of the heat source side refrigerant in the refrigerant circuit A will be described first.

A low-temperature low-pressure refrigerant is compressed by the compressor 10 and is discharged as a high-temperature high-pressure gas refrigerant. The high-temperature high-pressure gas refrigerant that has been discharged from the compressor 10 passes through the first refrigerant flow switching device 11 and flows out of the outdoor unit 1. The high-temperature high-pressure gas refrigerant that has flowed out of the outdoor unit 1 passes through the refrigerant pipe 4 and flows into the heat medium relay unit 3. The high-temperature high-pressure gas refrigerant that has flowed into the heat medium relay unit 3 flows into the intermediate heat exchanger 15 and is condensed and liquefied into a high-pressure liquid refrigerant while transferring heat to the heat medium circulating in the heat medium circuit B. Then, this liquid refrigerant flows out of the intermediate heat exchanger 15, is expanded into an intermediate-temperature intermediate-pressure two-phase refrigerant in the expansion device 16, flows out of the heat medium relay unit 3, and flows into the outdoor unit 1 again through the refrigerant pipe 4.

The refrigerant that has flowed into the outdoor unit 1 passes through the refrigerant-to-refrigerant heat exchanger 28, reaches the branching device 27, and is branched into two flows. One portion of the refrigerant that has been branched in the branching device 27 passes through the expansion device 14a, and is throttled into a low-temperature low-pressure two-phase refrigerant in the expansion device 14a. This refrigerant flows into the heat source side heat exchanger 12 functioning as an evaporator, absorbs heat from the outdoor air in the heat source side heat exchanger 12, and turns into a low-temperature low-pressure gas refrigerant. Then, the low-temperature low-pressure gas refrigerant flows out of the heat source side heat exchanger 12, passes through the first refrigerant flow switching device 11 and the accumulator 19, and is sucked into the compressor 10 again.

The other portion of the refrigerant that has been branched in the branching device 27 is throttled in the expansion device 14b and is turned into a two-phase refrigerant with an intermediate-pressure, which is a pressure substantially the same or slightly higher than the pressure inside the compression chamber of the compressor 10 at the time of injection. This intermediate-pressure two-phase refrigerant flows into the refrigerant-to-refrigerant heat exchanger 28 and exchanges heat with the mainstream refrigerant that is a refrigerant before being throttled by the expansion device 14a and that flows into the expansion device 14a. In the refrigerant-to-refrigerant heat exchanger 28, the mainstream refrigerant that flows into the expansion device 14a is cooled and the refrigerant that has flowed out of the expansion device 14b is heated. Then, the refrigerant that has flowed out of the refrigerant-to-refrigerant heat exchanger 28, flows through the injection pipe 4c, and is injected into the compression chamber of the compressor 10 through the opening port provided in the compression chamber of the compressor 10. By carrying out the above injection operation, the heating capacity under low outside air can be increased and also the operating efficiency can be improved.

Note that the opening degree of the expansion device 14a is controlled such that the refrigerant upstream of the expansion device 14a is maintained at a second intermediate pressure, the second intermediate pressure being a pressure lower than a high pressure, which is the refrigerant pressure inside the condenser, and higher than a low pressure, which is the refrigerant pressure inside the evaporator, and, further, being a pressure that is higher than the pressure inside the injection pipe 4c or the intermediate pressure, which is the pressure inside the compression chamber of the compressor 10 at the time of injection.

Figure 15:
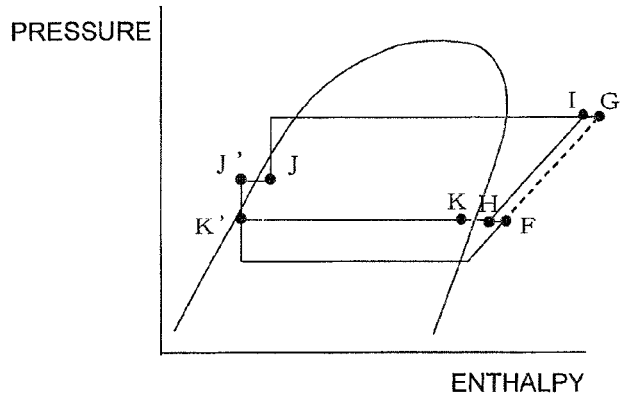
FIG. 15 is a P-h diagram (pressure-enthalpy diagram) illustrating a state transition of the heat source side refrigerant during the heating operation mode of the air-conditioning apparatus according to Embodiment 2 of the present invention.

An injection operation carried out by the air-conditioning apparatus 100A during the heating operation mode will be described. The injection operation during the above will be described with reference to FIG. 14 and FIG. 15. FIG. 15 is a P-h diagram (pressure-enthalpy diagram) illustrating a state transition of the heat source side refrigerant during the heating operation mode. In FIG. 15, the axis of ordinates indicates the pressure and the axis of abscissas indicates the enthalpy.

In the compressor 10, a low-temperature low-pressure gas refrigerant that has been drawn in from the suction port of the compressor 10 is introduced into the hermetic vessel. The low-temperature low-pressure gas refrigerant that has been filled in the hermetic vessel is sucked into the compression chamber (not shown). The internal volume of the compression chamber becomes smaller as rotation of 0 to 360 degrees is carried out by the motor (not shown). The internal refrigerant that has been sucked into the compression chamber is compressed and is increased in its pressure and temperature as the internal volume of the compression chamber is reduced. When the rotation angle of the motor reaches a preset angle, the opening port (formed in a portion of the compression chamber) is opened (the state at this moment is point F in FIG. 15) such that the inside of the compression chamber and the injection pipe 4c outside the compressor 10 are in communication with each other.

A portion of the refrigerant that returns to the outdoor unit 1 from the heat medium relay unit 3 through the refrigerant pipe 4 flows into the expansion device 14a through the branching device 27. With the function of the expansion device 14a, the pressure of the refrigerant upstream of the expansion device 14a is controlled to the second intermediate-pressure state (point J in FIG. 15). A portion of the two-phase refrigerant that has been turned into the intermediate-pressure state by the expansion device 14a is branched off in the branching device 27, flows in and is throttled to an intermediate pressure (point K' in FIG. 15) having a slight decrease in pressure by the expansion device 14b, and flows into the refrigerant-to-refrigerant heat exchanger 28. Heat is exchanged between the mainstream refrigerant, which is a second intermediate pressure flowing in the expansion device 14a, and a branched-off stream, which is the intermediate pressure that has been throttled in the expansion device 14b and that is lower than the second intermediate pressure, in the refrigerant-to-refrigerant heat exchanger 28. As such, the refrigerant in the mainstream is cooled (point J' in FIG. 15) and the refrigerant in the branched-off stream is heated (Point K in FIG. 14).

The heated branched-off refrigerant flows through the injection pipe 4c and is introduced into the compression chamber through the opening port of the compression chamber of the compressor 10. There are cases in which the control of the expansion device 14b is hindered when a two-phase state refrigerant flows therein. Accordingly, with the above configuration, the refrigerant in the intermediate-pressure two-phase state can be turned into an intermediate-pressure liquid refrigerant and be made to flow into the expansion device 14b, and, thus, the air-conditioning apparatus 100A is allowed to carry out stable control. In the compression chamber of the compressor 10, the injection refrigerant in the intermediate-pressure state (point K in FIG. 15) and the compressed refrigerant in the compression chamber (point F in FIG. 15) are mixed together (point H in FIG. 15), then, the refrigerant is compressed in the compressor 10 again and is discharged from the compress (point I in FIG. 15).

By carrying out the above injection, the air-conditioning apparatus 100A can improve its heating capacity under low outside air and can maintain the operating efficiency to be high as well. At this time, the operating efficiency (COP) can be maximized by optimally controlling the state (point K in FIG. 15) of the refrigerant that is introduced from the injection pipe 4c into the compression chamber of the compressor 10.

Note that the refrigerant state in which the COP is maximized is near the saturated gas state and the COP is most high in the two-phase state with slight wetness. However, it is slightly difficult to carry out control of maintaining the designated quality in this two-phase state. As such, the quality may be in a slightly dry state, for example, a degree of superheat of 1 degrees C. When there is a slight degree of superheat, then, the degree of superheat may be controlled with the temperature detected by the branched-refrigerant temperature detection device 33.

[Control of Injection Flow Rate]

Figure 16:
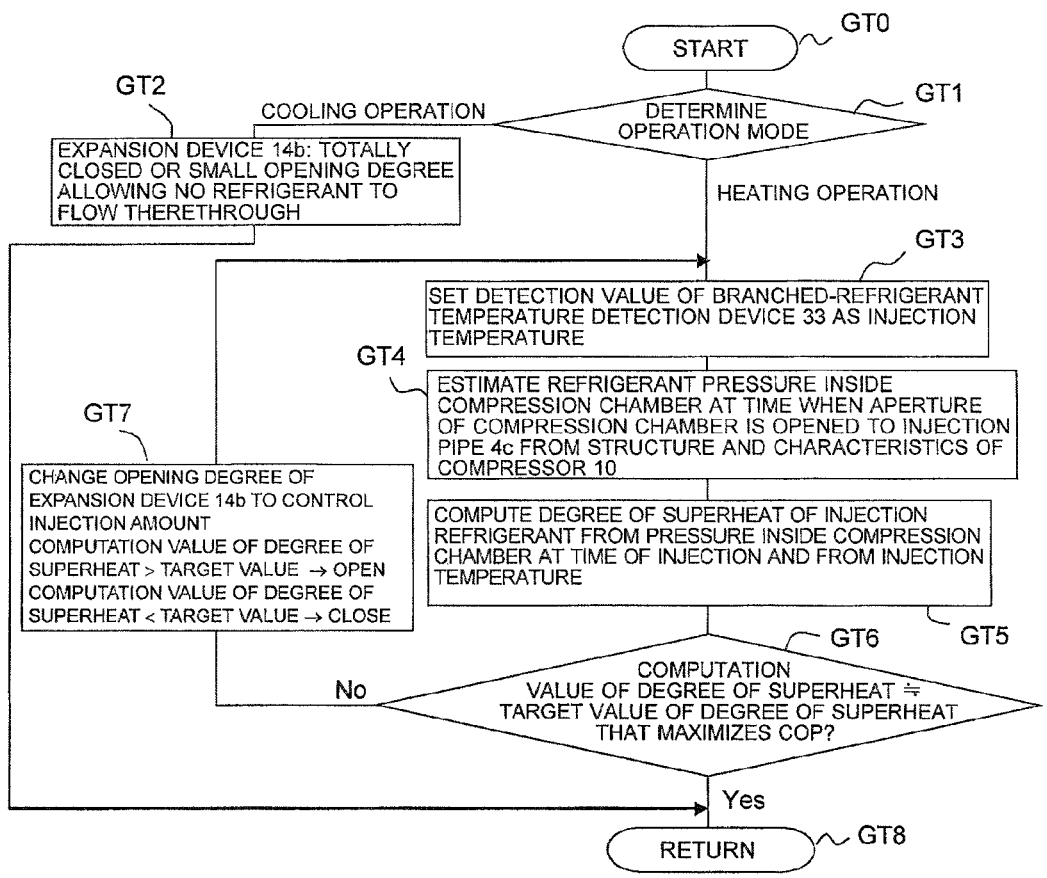
FIG. 16 is a flowchart illustrating a flow of an injection control process carried out by the air-conditioning apparatus according Embodiment 2 of the present invention.

FIG. 16 is a flowchart illustrating a flow of an injection control process carried out by the air-conditioning apparatus 100A. An injection control operation of the air-conditioning apparatus 100A will be described with reference to FIG. 16. Control of the degree of superheat of the injection refrigerant is carried out in the flowchart in FIG. 16. Note that while the injection is carried out to improve the heating capacity under a low outside air, both improvement of heating capacity under a low outside air and improvement of COP are considered when setting the target value of the quality and the target value of the degree of superheat that are target values of the injection control. As such, by carrying out the control in accordance with the target values, both advantages can be obtained.

When the process is started (GT0), the controller 50 carries out determination of the operation mode (GT1). When the operation mode is determined to be the cooling operation (GT1; Cooling operation), the controller 50 totally closes the opening degree of the expansion device 14b or sets the opening degree thereof to an opening degree allowing no refrigerant to flow therethrough (GT2) and completes the process (GT8). On the other hand, when the operation mode is determined to be the heating operation (GT1; Heating operation), the controller 50 proceeds to the next process.

First, the controller 50 sets the detection value of the branched-refrigerant temperature detection device 33 as an injection temperature (GT3). Next, the controller 50 estimates the refrigerant pressure inside the compression chamber at the time when the opening port is opened to the injection pipe 4c from the structure and characteristics of the compressor 10 (GT4). Then, the controller 50 computes a degree of superheat of the injection refrigerant from the pressure inside the compression chamber at the time of injection and from the injection temperature (GT5). After that, the controller 50 compares the computation value of the degree of superheat that has been computed and the preset target value of the degree of superheat of, for example, 1 degrees C., that maximizes the COP (GT6).

When the computation value of the degree of superheat and the target value of the degree of superheat are approximately equal to each other (GT6; Yes), the controller 50 completes the process (GT8). When the computation value of the degree of superheat and the target value of the degree of superheat are not approximately equal to each other (GT6; No), the controller 50 changes the opening degree of the expansion device 14b to control the injection amount (GT7). At this time, when the computation value of the degree of superheat is larger than the target value of the degree of superheat, the controller 50 changes the opening degree of the expansion device 14b towards the opening direction, that is, towards the direction in which the opening degree becomes larger, to increase the injection amount. Alternatively, when the computation value of the degree of superheat is smaller than the target value of the degree of superheat, the controller 50 changes the opening degree of the expansion device 14b towards the closing direction, that is, towards the direction in which the opening degree becomes smaller, to reduce the injection amount. The controller 50 then repeats the process from GT3.

Note that while an exemplary description has been given herein in which the injection refrigerant is in a dry state, such as a degree of superheat of 1 degrees C., to facilitate control, in actuality, it is known that the COP becomes higher when the injection refrigerant is in a state with slight wetness and that the COP is most high when the refrigerant after the refrigerant inside the compression chamber and the injection refrigerant are mixed has a quality in the range of 0.9 to 0.99 (0.9 or more and under 0.99).

In order to carry out control to the above state, a method that is similar to Embodiment 1 can be conceived in which the quality of the refrigerant after the mix is assumed, the discharge temperature in this case is estimated, the quality of the refrigerant after the mix is determined to be deviated from the target quality on the basis of the deviation with the actual discharge temperature, and correction is carried out. The details overlap the content described in Embodiment 1 and, thus, description is omitted. However, by carrying out control with the above method, it will be possible to maximize the COP even when the injection refrigerant is in a two-phase state. Alternatively, control may be carried out such that the resultant refrigerant after the refrigerant inside the compression chamber and the injection refrigerant are mixed is turned into a saturated state.

Additionally, other than the degree of superheat and the quality of the injection refrigerant, the enthalpy of the injection refrigerant may be used as the state quantity of the injection refrigerant.

Note that it has been described with the flowchart described above that the refrigerant pressure inside the compression chamber at the time when the opening port is opened to the injection pipe 4c is estimated from the structure and characteristics of the compressor 10. That is, by using the fact that the relationship between the pressure and volume inside the compression chamber before the compression and the relationship between the pressure and volume inside the compression chamber when the injection port is opened are expressed by the polytropic compression relation that is commonly known in the field of thermodynamics, the intermediate pressure is computed by prestoring the volume inside the compression chamber while in a state in which the opening port of the compressor is opened to the injection pipe, a value related to this volume, the ratio of the volume to the stroke volume of the compressor 10, and the like, and by using the pressure inside the compression chamber before the compression that is detected by the suction-refrigerant pressure detection device 40.

The above method allows the air-conditioning apparatus 100A to carry out control that maximizes the COP as much as possible while maintaining a sufficient heating capacity under low outside air.

Furthermore, a description of an exemplary system has been made herein illustrating a case in which the outdoor unit 1 houses the compressor 10, the first refrigerant flow switching device 11, the heat source side heat exchanger 12, the expansion device 14a, the expansion device 14b, and the refrigerant-to-refrigerant heat exchanger 28; the indoor units 2 each house an use side heat exchanger 26; the heat medium relay unit 3 houses the intermediate heat exchanger 15 and the expansion device 16; the outdoor unit 1 and the heat medium relay unit 3 are connected therebetween with a pair of pipes to circulate the refrigerant between the outdoor unit 1 and the heat medium relay unit 3; each of the indoor units 2 and the heat medium relay unit 3 are connected therebetween with a pair of pipes to circulate the heat medium between the indoor units 2 and the heat medium relay unit 3; and the refrigerant and the heat medium is made to exchange heat in the intermediate heat exchanger 15; however, the system is not limited to this arrangement.

For example, the air-conditioning apparatus 100A may be applied to a direct expansion system including the outdoor unit 1 that houses the compressor 10, a four-way valve (the first refrigerant flow switching device) 11, the heat source side heat exchanger 12, the expansion device 14a, the expansion device 14b, and the refrigerant-to-refrigerant heat exchanger 28; and the indoor units 2 that each houses a load side heat exchanger that exchanges heat between the air in the conditioned space and the refrigerant, and the expansion device 16, in which a plurality of indoor units is each connected with a pair of pipes to the outdoor unit 1, and refrigerant is circulated between the outdoor unit 1 and the indoor units 2 such that the cooling operation and the heating operation can be carried out. The same advantages can be obtained with this direct expansion system.

As above, the air-conditioning apparatus 100A according to Embodiment 2 can optimally control the injection flow rate to the compressor 100. Accordingly, the system COP is increased and contribution to energy saving can be achieved.

REFERENCE SIGNS LIST 1 outdoor unit; 2 indoor unit; 2a indoor unit; 2b indoor unit; 2c indoor unit; 2d indoor unit; 3 heat medium relay unit; 4 refrigerant pipe; 4a first connecting pipe; 4b second connecting pipe; 4c injection pipe; 4d branch pipe; 4e bypass pipe; 5 pipe; 6 outdoor space; 7 indoor space; 8 space; 9 structure; 10 compressor; 11 first refrigerant flow switching device; 12 heat source side heat exchanger; 13a check valve; 13b check valve; 13c check valve; 13d check valve; 14a expansion device (third expansion device); 14b expansion device (second expansion device); 15 intermediate heat exchanger; 15a intermediate heat exchanger; 15b intermediate heat exchanger; 16 expansion device (first expansion device); 16a expansion device; 16b expansion device; 17 opening and closing device; 17a opening and closing device; 17b opening and closing device; 18 second refrigerant flow switching device; 18a second refrigerant flow switching device; 18b second refrigerant flow switching device; 19 accumulator; 20 backflow prevention device; 21 pump; 21a pump; 21b pump; 22 first heat medium flow switching device; 22a first heat medium flow switching device; 22b first heat medium flow switching device; 22c first heat medium flow switching device; 22d first heat medium flow switching device; 23 second heat medium flow switching device; 23a second heat medium flow switching device; 23b second heat medium flow switching device; 23c second heat medium flow switching device; 23d second heat medium flow switching device; 24 opening and closing device; 25 heat medium flow control device; 25a heat medium flow control device; 25b heat medium flow control device; 25c heat medium flow control device; 25d heat medium flow control device; 26 use side heat exchanger; 26a use side heat exchanger; 26b use side heat exchanger; 26c use side heat exchanger; 26d use side heat exchanger; 27 branching device; 27a branching device (first refrigerant branching device); 27b branching device (second refrigerant branching device; 28 refrigerant-to-refrigerant heat exchanger; 31 first temperature sensor; 31a first temperature sensor; 31b first temperature sensor; 32 intermediate pressure detection device; 33 branched-refrigerant temperature detection device; 34 second temperature sensor; 34a second temperature sensor; 34b second temperature sensor; 34c second temperature sensor; 34d second temperature sensor; 35 third temperature sensor; 35a third temperature sensor; 35b third temperature sensor; 35c third temperature sensor; 35d third temperature sensor; 36 pressure sensor; 37 discharge-refrigerant temperature detection device; 38 suction-refrigerant temperature detection device; 39 high-pressure detection device; 40 suction-refrigerant pressure detection device; 50 controller; 100 air-conditioning apparatus; 100A air-conditioning apparatus; A refrigerant circuit; and B heat medium circuit.

The invention claimed is:

1. An air-conditioning apparatus including a refrigerant circuit constituted by connecting, with a pipe, a compressor, a refrigerant flow switching device, a first heat exchanger, a first expansion device, and at least one second heat exchanger, the air-conditioning apparatus comprising:
an injection pipe configured to introduce a refrigerant from outside the compressor into a compression chamber through an opening port, the opening port being provided in a portion of the compression chamber of the compressor that is in midst of performing a compression process;
a second expansion device provided in the injection pipe; and
a controller configured to control an amount of refrigerant injection into the compressor by controlling an opening degree of the second expansion device such that electric power consumption of the compressor reduces, a heating capacity or a cooling capacity of a load-side heat exchanger that is either the first heat exchanger or the at least one second heat exchanger increases, or
COP obtained by dividing the heating capacity or the cooling capacity by the electric power consumption increases,
wherein the injection pipe connects the opening port to one of a branch pipe and a pipe connecting the first expansion device and the first heat exchanger operating as an evaporator in the heating operation,
the branch pipe is connected between a pipe connecting the first heat exchanger operating as a condenser in the cooling operation and the first expansion device, and a pipe connecting the first expansion device and the first heat exchanger operating as an evaporator in the heating operation, and the controller has a function of controlling the amount of refrigerant injection on a basis of a state quantity of the refrigerant after the refrigerant inside the compression chamber and the refrigerant that has been introduced into the compression chamber have been merged and a state quantity of the refrigerant that has been discharged from the compressor.

2. An air-conditioning apparatus including a refrigerant circuit constituted by connecting, with a pipe, a compressor, a refrigerant flow switching device, a first heat exchanger, a first expansion device, and at least one second heat exchanger, the air-conditioning apparatus comprising:

an injection pipe configured to introduce a refrigerant from outside the compressor into a compression chamber through an opening port, the opening port being provided in a portion of the compression chamber of the compressor that is in midst of performing a compression process;

a second expansion device provided in the injection pipe; and a controller configured to control an amount of refrigerant injection into the compressor by controlling an opening degree of the second expansion device such that electric power consumption of the compressor reduces a heating capacity or a cooling capacity of a load-side heat exchanger that is either the first heat exchanger or the at least one second heat exchanger increases, or COP obtained by dividing the heating capacity or the cooling capacity by the electric power consumption increases, wherein a suction pressure detection device is configured to detect a pressure of the refrigerant sucked into the compressor, the injection pipe connects the opening port to one of a branch Pine and a pipe connecting the first expansion device and the first heat exchanger operating as an evaporator in the heating operation, the branch pipe is connected between a pipe connecting the first heat exchanger operating as a condenser in the cooling operation and the first expansion device, and a pipe connecting the first expansion device and the first heat exchanger operating as an evaporator in the heating operation, the controller has a function of measuring or estimating a state quantity of the refrigerant to be introduced into the compression chamber from the injection pipe, and a function of controlling the amount of refrigerant injection on a basis of the state quantity of the refrigerant that is to be injected by the refrigerant injection, and the controller further has a function of estimating an intermediate pressure inside the compression chamber under a state in which the opening port of the compressor is opened to the injection pipe by using at least a detection pressure of the suction pressure detection device, and a function of computing, by using the intermediate pressure, a target value in control of a discharge temperature of the refrigerant discharged from the compressor, the target value being for controlling the amount of refrigerant injection.

3. The air-conditioning apparatus of claim 2, wherein the state quantity of the refrigerant to be injected is any one of a degree of superheat of the refrigerant to be injected, a quality of the refrigerant to be injected, and an enthalpy of the refrigerant to be injected.

4. The air-conditioning apparatus of claim 1, wherein the state quantity of the refrigerant after the merge is any one of a quality of the refrigerant immediately after the merge, a degree of superheat of the refrigerant immediately after the merge, and an enthalpy of the refrigerant immediately after the merge, and the state quantity of the discharge refrigerant is a temperature of the discharge refrigerant or an enthalpy of the discharge refrigerant.

5. The air-conditioning apparatus of claim 1, wherein a state of the refrigerant after the merge is a two-phase state and the quality of the refrigerant after the merge is 0.9 or more and less than 0.99.

6. The air-conditioning apparatus of claim 2, wherein the controller computes the intermediate pressure by using a prestored volume of the compression chamber in the state in which the opening port of the compression chamber is opened to the injection pipe or by using a prestored ratio of the volume of the compression chamber to a stroke volume of the compressor.

7. An air-conditioning apparatus including a refrigerant circuit constituted by connecting, with a pipe, a compressor, a refrigerant flow switching device, a first heat exchanger, a first expansion device, and at least one second heat exchanger, the air-conditioning apparatus comprising:

an injection pipe configured to introduce a refrigerant from outside the compressor into a compression chamber through an opening port, the opening port being provided in a portion of the compression chamber of the compressor that is in midst of performing a compression process;

a second expansion device provided in the injection pipe; and a controller configured to control an amount of refrigerant injection into the compressor by controlling an opening degree of the second expansion device such that electric power consumption of the compressor reduces a heating capacity or a cooling capacity of a load-side heat exchanger that is either the first heat exchanger or the at least one second heat exchanger increases, or COP obtained by dividing the heating capacity or the cooling capacity by the electric power consumption increases, wherein the injection pipe connects the opening port to one of a branch pipe and a pipe connecting the first expansion device and the first heat exchanger operating as an evaporator in the heating operation, the branch pipe is connected between a pipe connecting the first heat exchanger operating as a condenser in the cooling operation and the first expansion device, and a pipe connecting the first expansion device and the first heat exchanger operating as an evaporator in the heating operation, at least a heating operation can be carried out in which a refrigerant of low pressure is made to flow into the first heat exchanger to operate the first heat exchanger as an evaporator and in which a refrigerant of high pressure is made to flow into at least one or all of the at least one second heat exchanger to operate one or all of the at least one second heat exchanger as a condenser or condensers, a third expansion device is provided in a refrigerant passage from the at least one second heat exchanger to the first heat exchanger at a time when the heating operation is being performed, wherein the third expansion device is capable of generating a second intermediate pressure that is lower than the high pressure and that is higher than the low pressure, during the heating operation, a passage on an upstream side of the third expansion device and a passage on an upstream side of the second expansion device are connected with a pipe, and during the heating operation, the refrigerant is introduced into the opening port while having the second intermediate pressure generated by the third expansion device.

8. The air-conditioning apparatus of claim 1, wherein working of the refrigerant flow switching device allows switching between
- a cooling operation in which a refrigerant of high pressure is made to flow into the first heat exchanger to operate the first heat exchanger as a condenser and in which a refrigerant of low pressure is made to flow into at least one or all of the at least one second heat exchanger to operate the at least one or all of the at least one second heat exchanger as an evaporator or evaporators, and
- a heating operation in which a refrigerant of low pressure is made to flow into the first heat exchanger to operate the first heat exchanger as an evaporator and in which a refrigerant of high pressure is made to flow into at least one or all of the at least one second heat exchanger to operate the at least one or all of the at least one second heat exchanger as a condenser or condensers, a third expansion device is provided in any position in the refrigerant circuit, the third expansion device being capable of generating a second intermediate pressure that is lower than the high pressure and that is higher than the low pressure, during the cooling operation, the refrigerant does not pass through the third expansion device and flows between the first heat exchanger and the at least one or all of the at least one second heat exchanger and a portion of the refrigerant in a high-pressure state is introduced into the opening port, and during the heating operation, the refrigerant passes through the third expansion device from the at least one second heat exchanger, and flows into the first heat exchanger, while a portion of the refrigerant in a state of having the second intermediate pressure generated by the third expansion device is introduced into the opening port.

9. The air-conditioning apparatus of claim 1, further comprising a first refrigerant branching device disposed in a passage between the first heat exchanger and the first expansion device, the first refrigerant branching device being configured to branch the refrigerant flowing from the first heat exchanger to the first expansion device;
- a second refrigerant branching device disposed in a passage between the at least one second heat exchanger and the first heat exchanger, the second refrigerant branching device being configured to branch the refrigerant flowing from the at least one second heat exchanger to the first heat exchanger, and
- the third refrigerant expansion device disposed in a passage between the second refrigerant branching device and the first heat exchanger, the third refrigerant expansion device being configured to decompress the refrigerant flowing from the second refrigerant branching device to the first heat exchanger, wherein
the branch pipe connects the first refrigerant branching device and the second refrigerant branching device, the air-conditioning apparatus further comprising:
- a connecting port configured to connect any position of the branch pipe to the injection pipe;
- an opening and closing device provided in the branch pipe; and
- a backflow prevention device disposed between a portion connecting the branch pipe with the injection pipe and the second refrigerant branching device.

10. The air-conditioning apparatus of claim 9, wherein the compressor, the refrigerant flow switching device, and the first heat exchanger are housed in the outdoor unit,
the first expansion device and the at least one second heat exchanger are housed in the heat medium relay unit,
the outdoor unit and the heat medium relay unit are connected with two refrigerant pipes,
the heat medium relay unit and a plurality of indoor units that heat or cool air in an air-conditioning target space are connected with a pipe through which a heat medium flows,
a cooling only operation mode is provided, in which a high-pressure liquid refrigerant flows in one of the two refrigerant pipes and a low-pressure gas refrigerant flows in the other one of the two refrigerant pipes,
a heating only operation mode is provided, in which a high-pressure gas refrigerant flows in one of the two refrigerant pipes and an intermediate-pressure two-phase refrigerant flows in the other one of the two extension pipes,
in the cooling only operation mode, the opening and closing device is opened and the high-pressure liquid refrigerant is introduced from the first refrigerant branching device into the branch pipe through the opening and closing device, and
in the heating only operation mode, the opening and closing device is closed and the intermediate-pressure two-phase refrigerant is introduced from the second refrigerant branching device into the branch pipe.

11. The air-conditioning apparatus of claim 10, wherein a cooling main operation mode is provided, in which a high-pressure two-phase refrigerant flows in one of the two refrigerant pipes and a low-pressure gas refrigerant flows in the other one of the two refrigerant pipes,
a heating main operation mode is provided, in which a high-pressure gas refrigerant flows in one of the two refrigerant pipes and an intermediate-pressure two-phase refrigerant flows in the other one of the two refrigerant pipes,
in the cooling main operation mode, the opening and closing device is opened and the high-pressure two-phase refrigerant is introduced from the first refrigerant branching device into the branch pipe through the opening and closing device, and
in the heating main operation mode, the opening and closing device is closed and the intermediate-pressure two-phase refrigerant is introduced from the second refrigerant branching device into the branch pipe.

12. The air-conditioning apparatus of claim 7, wherein a detection device capable of detecting a pressure or a temperature is disposed in a position allowing measurement of the second intermediate pressure, and
the controller controls the third expansion device such that a detection pressure of the detection device or a saturation pressure of a detection temperature of the detection device, or the detection temperature of the detection device or a saturation temperature of the detection pressure of the detection device approximates a target value or is within a target range.

* * * * *